United States Patent [19]
Kudo et al.

[11] Patent Number: 5,119,122
[45] Date of Patent: Jun. 2, 1992

[54] CAMERA CAPABLE OF PROVIDING A PSEUDO PRINT FORMAT

[75] Inventors: Yoshinobu Kudo, Osaka; Shigeru Wada, Kishiwada; Hiroshi Ootsuka, Sakai; Masataka Hamada, Osakasayama; Yoshiaki Hata, Ashiya; Manabu Inoue, Kobe; Yoshihiro Tanaka, Osaka, all of Japan.

[73] Assignee: Minolta Camera Kabushiki Kaisha, Osaka, Japan

[21] Appl. No.: 579,971

[22] Filed: Sep. 10, 1990

[30] Foreign Application Priority Data

Sep. 11, 1989 [JP] Japan ............................ 1-236450
Sep. 11, 1989 [JP] Japan ............................ 1-236451
Sep. 11, 1989 [JP] Japan ............................ 1-236452
Sep. 11, 1989 [JP] Japan ............................ 1-236453

[51] Int. Cl.⁵ .................. G03B 5/00; G03B 13/12; G03B 15/03; G03B 17/24
[52] U.S. Cl. ........................... 354/400; 354/413; 354/195.1; 354/195.13; 354/199; 354/106; 354/222; 354/266
[58] Field of Search ............... 354/400, 413, 456, 105, 354/106, 195.1, 195.12, 195.13, 222, 199-201, 266, 75, 76

[56] References Cited

U.S. PATENT DOCUMENTS

| 4,550,996 | 11/1985 | Taniguchi et al. | 354/416 |
| 4,639,111 | 1/1987 | Harvey | 354/195.1 X |
| 4,847,646 | 7/1989 | Taniguchi et al. | 354/106 |
| 4,909,614 | 3/1990 | Itoh et al. | 354/222 X |
| 4,929,971 | 5/1990 | Imura et al. | 354/106 X |
| 4,955,715 | 9/1990 | Kitagishi | 354/106 X |
| 4,963,907 | 10/1990 | Inoue et al. | 354/222 |
| 4,967,214 | 10/1990 | Taniguchi et al. | 354/105 X |
| 4,974,096 | 11/1990 | Wash | 354/76 X |
| 4,982,213 | 1/1991 | Kazami et al. | 354/195.12 |

FOREIGN PATENT DOCUMENTS 63-316834 12/1988 Japan.
1-107240 4/1989 Japan.

Primary Examiner—W. B. Perkey
Attorney, Agent, or Firm—Burns, Doane, Swecker & Mathis

[57] ABSTRACT

A camera includes a taking lens for photographing an object, a detection device for detecting the brightness of the object, a driver device for driving the taking lens to change a first magnification representing image size of the object, a generator device for generating a signal of a second magnification irrespective of the first magnification, a direction device for directing an integrated magnification; and a determination device for determining both of the first and second magnifications according to the directed magnification and the detected brightness.

11 Claims, 18 Drawing Sheets

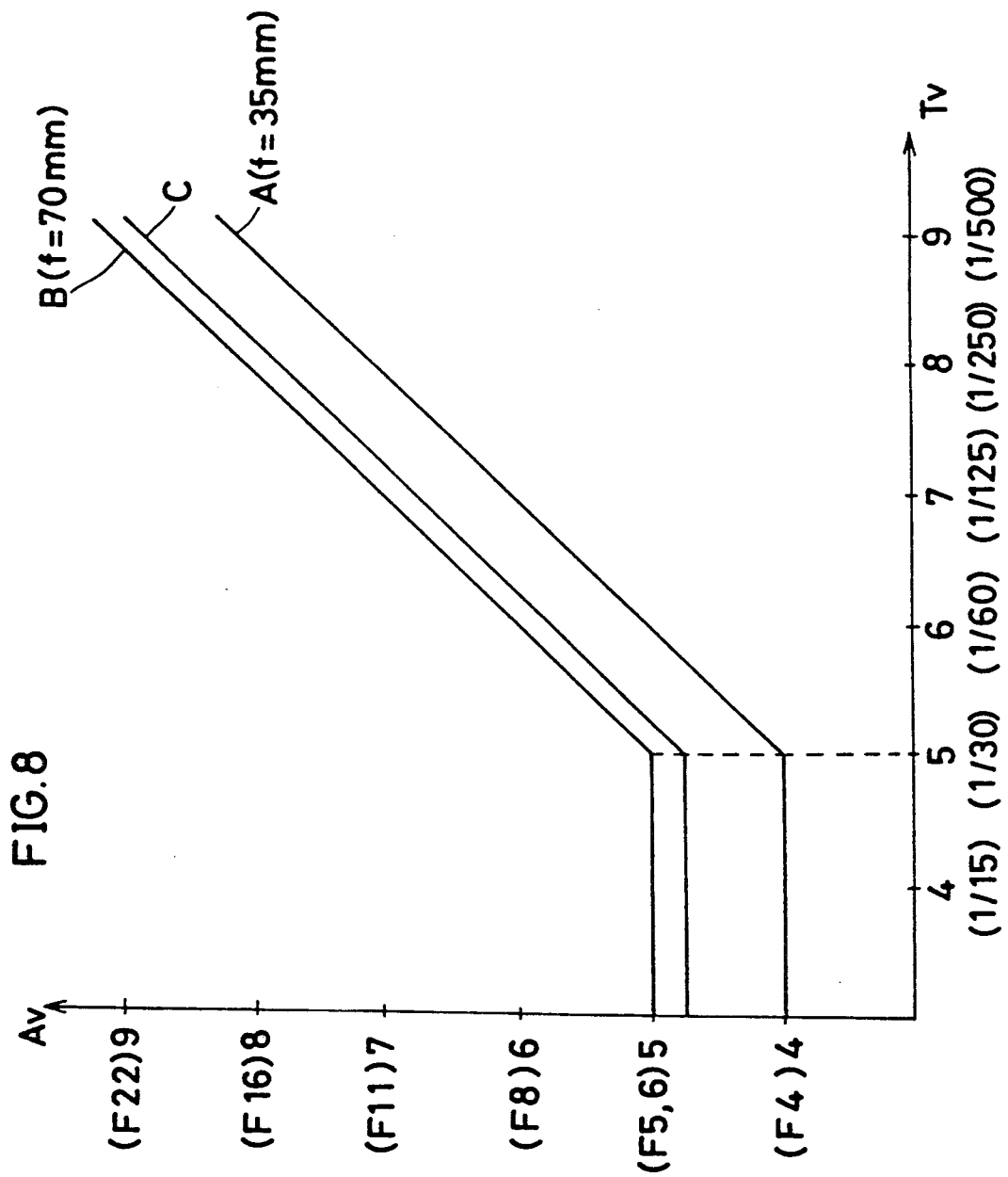

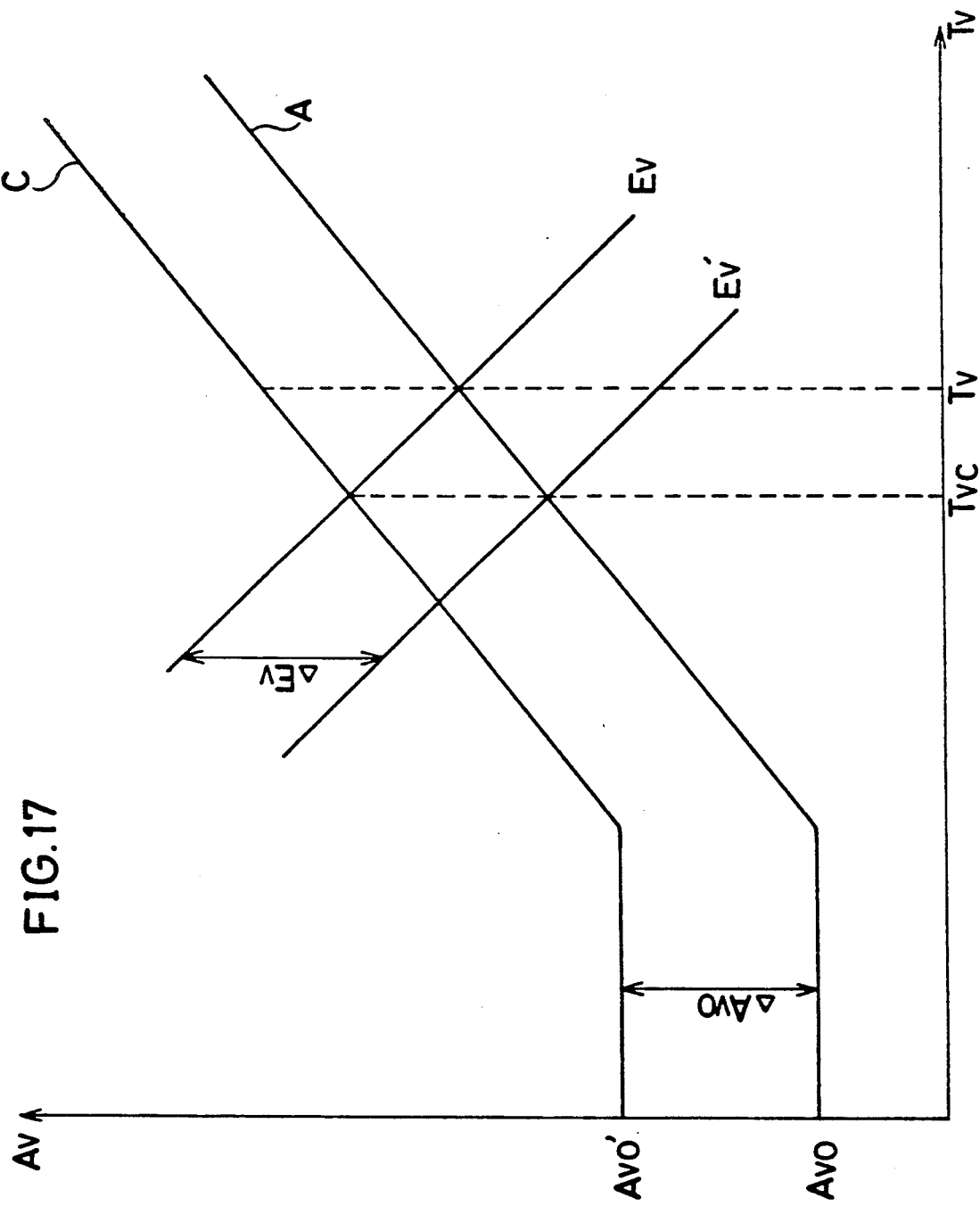

CAMERA CAPABLE OF PROVIDING A PSEUDO PRINT FORMAT

BACKGROUND OF THE INVENTION AND RELATED ART STATEMENT

This invention relates to a camera capable of performing real zooming by varying the focal length of a taking lens, and pseudo zooming by varying pseudo print format.

There has been known a camera in which pseudo telephoto print information such as pseudo magnification is recorded on an exposed film or the like. The pseudo print information is used to produce a pseudo telephoto print by enlarging a part of an image on the nagative to a desired view field angle.

Japanese Unexamined Patent Publication No. 61-295534, for example, discloses a camera in which pseudo print information is written on a near portion of an exposed film frame when photography is executed in a pseudo zooming. During the printing process, a central portion of the negative frame which has been exposed in the pseudo zooming is enlarged in accordance with the written pseudo print information. Consequently, the same print can be obtained as photographed in the real zooming having the same magnification.

Also, Japanese Unexamined Patent Publication No. 62-135818 discloses a camera capable of performing real zooming and pseudo zooming in which pseudo print information is written on a portion of an exposed film frame which is not to be printed in the printing process.

Further, Japanese Unexamined Patent Publication No. 63-29821 discloses a camera carrying a program having a plurality of selectable control curves defined by object distances and pseudo magnifications. Only a pseudo magnification is calculated in accordance with a detected object distance and a selected control curve. This camera has only function of performing pseudo zooming. In other words, photography is executed at a fixed real focal length. In the printing process, a central portion of the nagative is enlarged at the calculated pseudo magnification to have a pseudo zoomed image.

Moreover, there has been known a camera having a zoomable taking lens in which it is carried out based on a detected object distance to calculate such a focal length as to provide a predetermined magnification, and the taking lens is automatically operated to attain the calculated focal length.

However, it will be seen that these conventional cameras have the following drawbacks.

The cameras of Japanese Unexamined Patent Publication Nos. 61-295534 and 62-135818 have the two functions of real zooming and pseudo zooming. However, these camera cannot automatically calculate a proper focal length in accordance with a detected object distance and then automatically adjust the taking lens to have the proper focal length. It is necessary to adjust the taking lens manually. Accordingly, in the case of photographing a moving object, it is very difficult to attain a proper view field angle soon.

On the other hand, the camera of Japanese Unexamined Patent Publication No. 63-29821 and the last-mentioned camera can automatically calculate a proper focal length in accordance with a detected object distance and then automatically adjust the taking lens to have the proper focal length. However, these camera cannot perform only one of real zooming and pseudo zooming. Accordingly, these cameras provide smaller magnification ranges than cameras having two functions of real zooming and pseudo zooming.

Also, in the camera of Japanese Unexamined Patent Publication No. 61-295534, a priority is given to the real zooming. When a desired magnification is beyond the magnification of the real zooming, the pseudo zooming is put in work. If the camera carries a certain taking lens whose f-number varies with a focal length variation, the shutter speed becomes slower when the object is dimmer, a photography error is likely to occur due to a camera shake. For example, when a taking lens having a focal length range of 35 mm to 70 mm and a f-number range of 4.0 to 5.6 is zoomed twofold, the exposure value lowers 1Ev. In this case, if a dark object is photographed in the real zooming, the shutter speed is considerably slowed and the photography receives a worse influence of camera shake. The real zooming photography becomes more difficult with the f-number range being greater.

Also, in flash photography, a flash light coverage distance which a flash light can reach is comparatively small. Accordingly, only near objects can be photographed in the real zooming by a flash light. Thus, zooming photography cannot fully be carried out. Specifically, when the guide number of a flash device is Gno, and the f-number of the taking lens is Fno, the flash light coverage distance d can be expressed as follows:

$$d = Gno / Fno$$

Accordingly, it will be seen that the f-number increases with the focal length of the taking lens being increased, the flash light coverage distance then decreasing. In other words, proper flash photography is limited in nearer objects.

Furthermore, in the above-mentioned cameras, changing of the view field angle inevitably requires driving of the taking lens. Consequently, a longer time is consumed to set the taking lens at a proper focal length. Particularly, in the camera in which the taking lens is automatically driven, the driving of the taking lens is executed each time an object moves. Accordingly, photography setting cannot be attained promptly. Also, the taking lens is driven by use of electrically driven motor. Accordingly, unnecessary electrical power is consumed to drive the taking lens.

SUMMARY OF THE INVENTION

It is an object of the present invention to provide a camera which has overcome the above-mentioned drawbacks.

It is another object of the present invention to provide a camera which makes it possible to attain a proper view field angle promptly.

It is another object of the present invention to provide a camera having a greater magnification range.

It is another object of the present invention to provide a camera which makes it possible to eliminate worse influence of camera shake even when photographing a dark object.

It is another object of the present invention to provide a camera which consumes a reduced power energy.

Accordingly, a camera of the present invention comprises a taking lens for photographing an object, means for detecting brightness of the object, means for driving the taking lens to change a first magnification representing image size of the object, means for generating a signal of a second magnification irrespective of the first magnification, means for directing an integrated magnification, and means for determining both of the first and second magnifications according to the directed magnification and the detected brightness.

Also, a camera of the present invention comprises a taking lens for photographing an object, a flash device for illuminating the object, means for detecting that the flash device is used, means for driving the taking lens to change a first magnification representing image size of the object, means for generating a second signal of a second magnification irrespective of the first magnification, means for directing an integrated magnification, and means for determining both of the first and second magnifications according to the directed magnification and detected result of the detecting means.

Further, a camera of the present invention comprises a taking lens for photographing an object, a viewfinder for showing the object to a photographer, means for driving the taking lens to change a real focal length of the taking lens, means for generating a first signal of a pseudo focal length, means for directing an integrated focal length, means for controlling magnification of the viewfinder according to the directed magnification prior to photographing, and means for determining both of the real and pseudo focal lengths according to the directed magnification after operation of the shifting means.

Further, a camera of the present invention comprises a taking lens for photographing an object, means for driving the taking lens to change a first magnification of the object, means for generating a first signal of a second magnification irrespective of the first magnification, means for directing an integrated magnification, means for detecting a distance to the object, and means for determining both of the first and the second magnifications according to the detected distance and the directed magnification.

These and other objects, features and advantages of the present invention will become more apparent upon a reading of the following detailed description and drawings.

BRIEF DESCRIPTION OF DRAWINGS

FIG. 8 is a diagram showing program control curves defined by shutter speeds and aperture values;

FIG. 17 is a diagram showing an exposure correction in accordance with a focal length change of a taking lens.

DETAILED DESCRIPTION OF PREFERRED EMBODIMENTS OF THE INVENTION

A camera of the present invention will be described with reference to drawings. The camera carries a zooming taking lens 1 having a focal length range of 35 mm to 70 mm. Also, the camera has a pseudo magnification of 2. Accordingly, the camera can provide a greater focal length range of 35 mm to 140 mm by combining a real zooming and a pseudo zooming.

Figure 1:
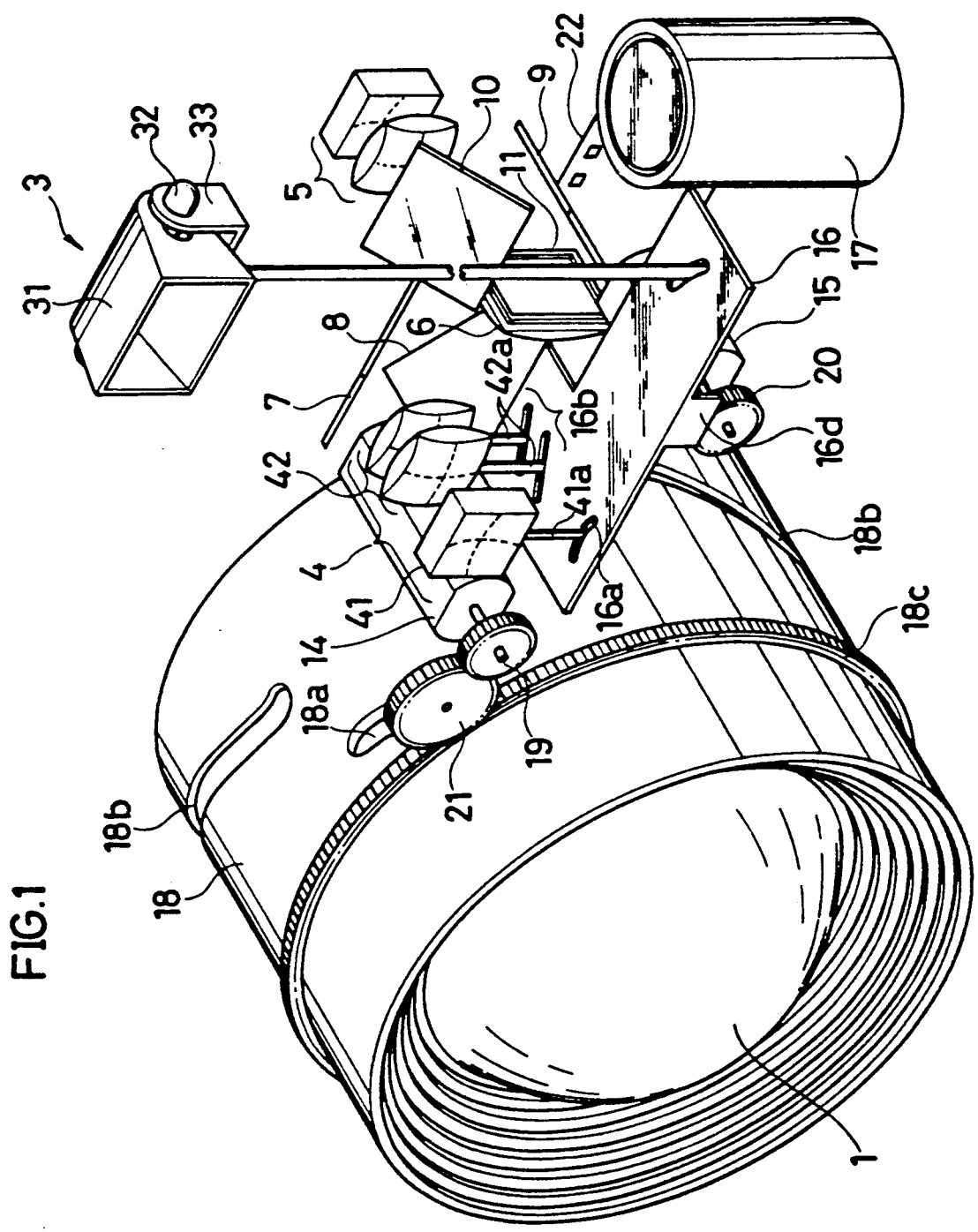
FIG. 1 is a perspective view showing an optical system of a camera embodying the present invention.
Figure 2:
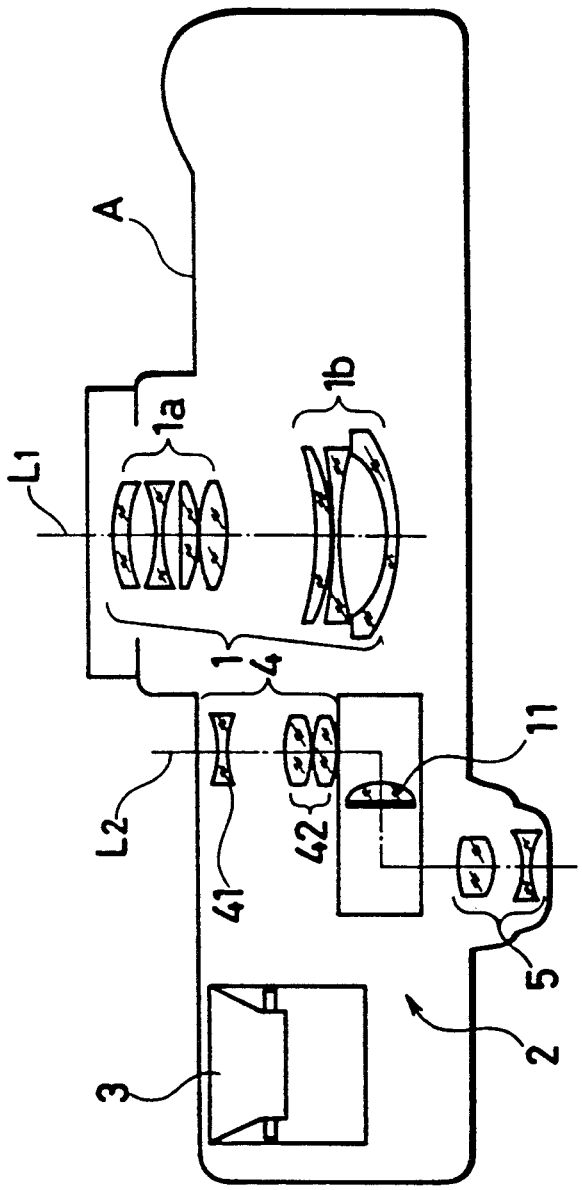
FIG. 2 is a plan view showing the optical system.

FIG. 1 shows an arrangement of the taking lens 1, a viewfinder 2, and a flash device 3 of the camera in a perspective view. FIG. 2 shows the arrangement in a plan view. The zooming taking lens 1 includes a forward lens member 1a and a rearward lens member 1b. The forward lens member 1a and the rearward lens member 1b are movably engaged with a linear guide (not shown) formed in a barrel and slidably engaged with cam grooves 18a, 18b of a cam ring 18, respectively.

Teeth 18a are formed on a peripheral portion of the cam ring 18. The teeth 18c is meshed with a gear 21 which is in turn meshed with a gear 19 of a zoom lens motor 14 (hereinafter referred to as ZL-motor). Accordingly, the rotational force of the ZL-motor 14 is transmitted to the cam ring 18 through the gears 19, 21 and the teeth 18c to rotate the cam ring 18. The forward and rearward lens members 1a, 1b are respectively pused by the cam grooves 18a, 18b according to the rotation of the cam ring 18 to move on an optical axis L1 (see FIG. 2) along the linear guide at different speeds. When the positions of the forward and rearward lens members 1a, 1b are changed, the focal length of the taking lens 1 is changed. The f-number of the taking lens 1 is changed according to the focal length. When the focal length is 35 mm, the f-number is 4. When the focal length is 70 mm, the f-number is 5.6. A viewfinder 2 is a zoom finder having an objective lens 4 including a forward member 41 and a rearward member 42. Support members 41a, 42a of the forward and rearward members 41, 42 are slidably engaged with the cam grooves 16a, 16b formed in a cam plate 16 and movably engaged with a linear guide groove (not shown) of a linear guide plate 23 (see FIG. 4) provided under the cam plate 16, respectively. A rack 16d is formed in a forward end of the cam plate 16. A gear 20 of a viewfinder motor 15 (hereinafter referred to as F-motor) is engaged with the rack 16d. With the above arrangement, when the F-motor 15 is driven, the cam plate 16 is horizontally moved perpendicularly to an optical axis L2 (see FIG. 2). According to the parallel movement, the forward and rearward members 41, 42 are respectively pushed by the cam grooves 16a, 16b to move on the optical axis L2 at different speeds along the linear guide groove. When the positions of the forward and rearward members 41, 42 are changed, the focal length of the objective lens 4 is changed.

The optical axis L1 of the taking lens 1 is parallel with the optical axis L2 of the objective lens 4. The focal length range of the objective lens 4 is greater than that of the taking lens 1.

Figure 3:
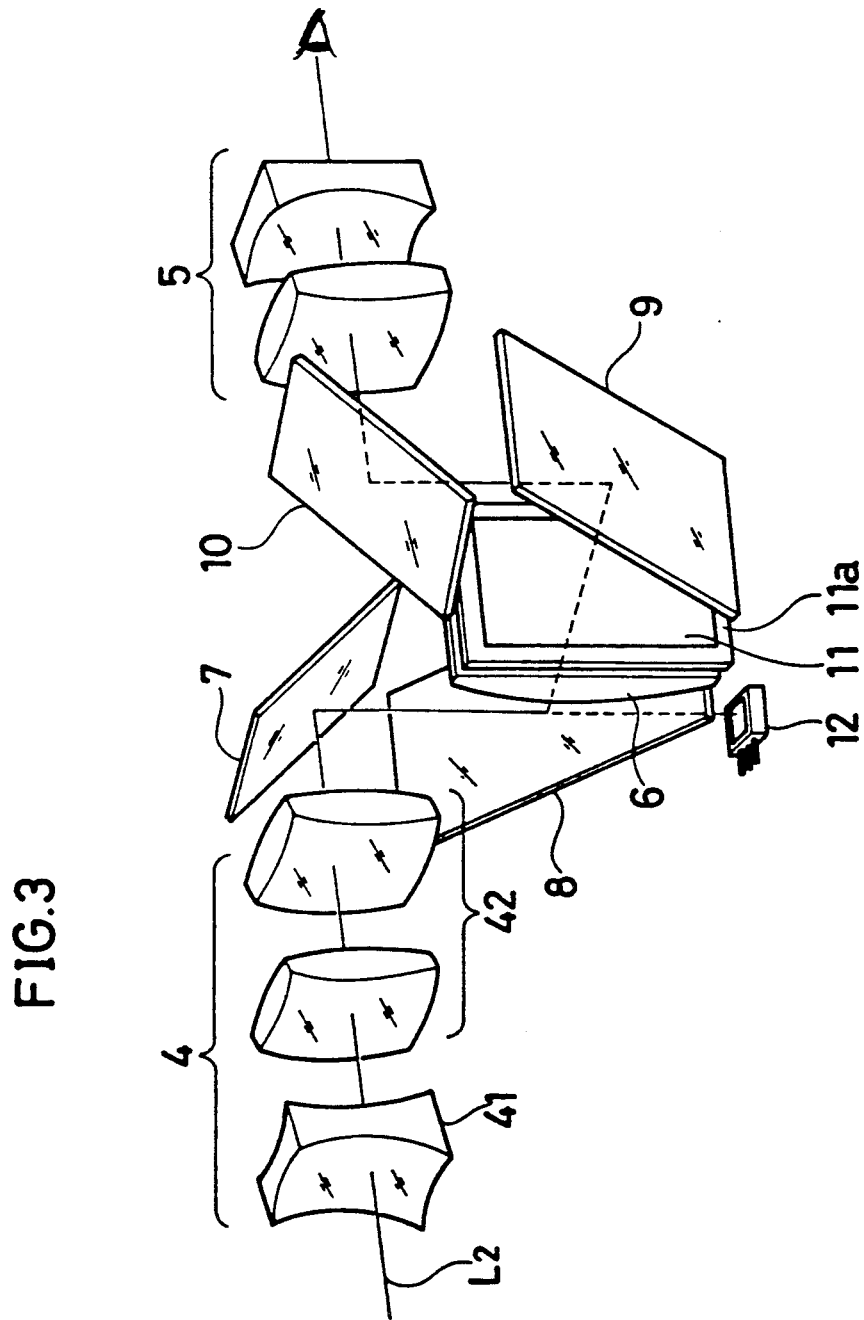
FIG. 3 is a perspective view showing an optical system of a viewfinder of the camera.

Referring to FIG. 3 showing an optical system of the viewfinder 2, the viewfinder 2 includes an eye-piece lens 5, condensor lens 6, a Porro mirror system of mirrors 7 to 10, a finder field unit 11, and a photocell 12 provided below the mirror 8. The photocell 12 is disposed at a position which is apart away from the mirror 8 at the same distance as the finder field unit 11. The photocell 12 has a light reception surface made of a ultraviolet ray reflection film. A filter for shutting off ultraviolet rays is omitted to simplify the construction.

Light transmitted through the objective lens 4 is reflected by the mirrors 7, 8, then transmitted through the condensor lens 6 and thereafter forms an inverted image of the object on the finder field unit 11 which is disposed in a focal plane of the objective lens 4. The finder field unit 11 includes an electro-optical device such as LCD or ECD. A masking portion 11 is provided in a peripheral portion of the finder field unit 11. In the finder field unit 11 is provided an indication of real zooming or pseudo zooming, and an indication of a focal length calculated in a program zooming, as described below.

The inverted image formed on the finder field unit 11 is turned to an erect image by the mirrors 9, 10 to introduce the eye-piece lens 5. A photographer can view the image of the object surrounded by the masking portion 11a through the eye-piece lens 5.

The mirror 8 is made of a partial transparent mirror, a partial half-transparent mirror, or an entire half-transparent mirror. The partial transparent mirror has a transparent portion of a hole formed at a center portion of the reflecting surface. The partial half-transparent mirror has a half-transparent portion at a center portion of the reflecting surface. The entire half-transparent mirror is half transparent in the entire surface.

The mirror 8 causes a part of the light transmitted through the objective lens 4 to be indicent upon the photocell 12. A signal produced by the photocell 12 is used for an exposure calculation, and also used for controlling flash light in the flash photography. Also, it may be appropriate that the mirror 7 is made of a half-transparent mirror and the photocell 12 is disposed at a position which is apart away from the mirror 7 at the same distance as the finder field unit 11. Further, although the photocell 12 is provided in the viewfinder 12 in this embodiment, it may be appropriate to provide the photocell 12 in the camera body to receive light transmitted through the taking lens 1.

Figure 4:
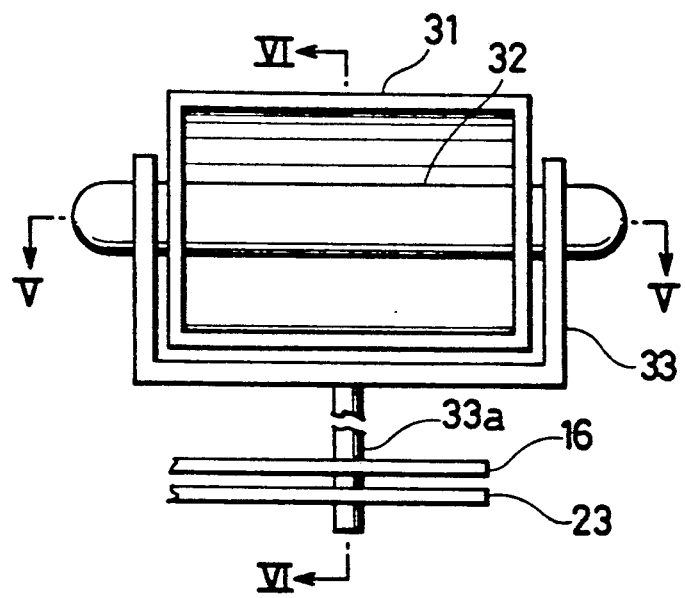
FIG. 4 is a front view of a flash device.
Figure 5:
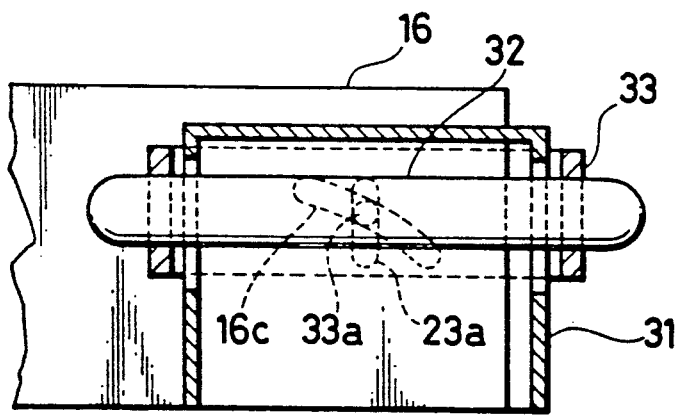
FIG. 5 is a cross sectional view taken along the line V—V in FIG. 4.
Figure 6:
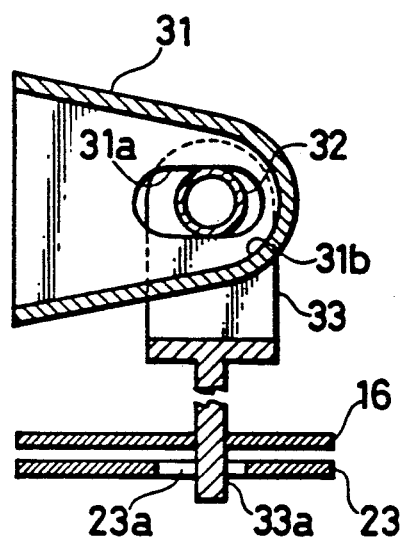
FIG. 6 is a cross sectional view taken along the line VI—VI in FIG. 4.

Referring again to FIG. 1, a xenon lamp 32 of a flash device 3 is movable in forward and rearward directions which are parallel with the optical axis L1 in accordance with the horizontal movement of the cam plate 16. FIG. 4 is a front view of the flash device 3. FIG. 5 is a cross sectional view taken along the line V—V in FIG. 4. FIG. 6 is a cross sectional view taken along the line VI—VI in FIG. 4.

A support member 33a of a holder 33 in the flash device 3 is slidably engaged with the cam groove 16c provided in the cam plate 16 and movably engaged with a linear guide groove 23a of the linear guide plate 23 (see FIG. 4). As described above, when the cam plate 16 is moved horizontally, the support member 33a is pushed by the cam groove 16c to move the holder 33 in the forward and rearward directions. On the other hand, a reflecting shade 31 is fixed on the camera body A. When the holder 33 is moved in the forward and rearward directions, the xenon lamp 32 held on the holder 33 is moved along a guide groove 31a formed in the sides of the reflecting shade 31. The guide groove 31a is parallel with the optical axis L1. Accordingly, a relative position between the xenon lamp 32 and a reflecting surface of the reflecting shade 31 is changed.

Accordingly, as the focal length of the viewfinder 2 increases, the illuminating angle of the flash device 3 becomes narrow, in other words, the flash light coverage range of the flash device 3 becomes far. As the focal length of the viewfinder 2 decreases, the illuminating angle of the flash device 3 becomes wide, in other words, the flash light coverage range of the flash device 3 becomes near.

When the zoom switch is actuated to drive the F-motor 15 in the clockwise direction, the cam plate 16 is moved away from the taking lens 1, and the forward and rearward members 4a, 4b of the objective lens 4 of the viewfinder 2 are moved in the forward direction along the linear guide with decreasing the distance between them, in other words, with the focal length of the objective lens 4 increasing. Consequently, the image magnification of the viewfinder 2 increases.

On the other hand, the holder 33 of the flash device 3 moves in the rearward direction along the linear guide 23a in accordance with the movement of the plate 16. Consequently, the relative distance between the xenon lamp 32 and the reflecting surface 31b decreases, and the illuminating angle of the flash device 3 becomes narrow. When the F-motor 15 is driven in the counterclockwise direction, the cam plate 16 is moved toward the taking lens 1, and movements of the forward and rearward members 4a, 4b of the objective lens 4 and the holder 33 of the flash device 3 are reversed respectively. Consequently, the magnification of the viewfinder decreases, and the illuminating angle of the flash device 3 becomes wide.

It will be noted that in this embodiment, the illuminating angle of the flash device 3 is changed in synchronization with the movement of the objective lens 4, but it is permittable to change the illuminating angle of the flash device 3 in synchronization with the movement of the taking lens 1.

Furthermore, indicated at 17 is a film container, indicated at 22 a film. The film container 17 has a microcomputer carrying a memory. Pseudo telephoto print information such as pseudo magnification can be recorded in the memory.

Figure 7A:
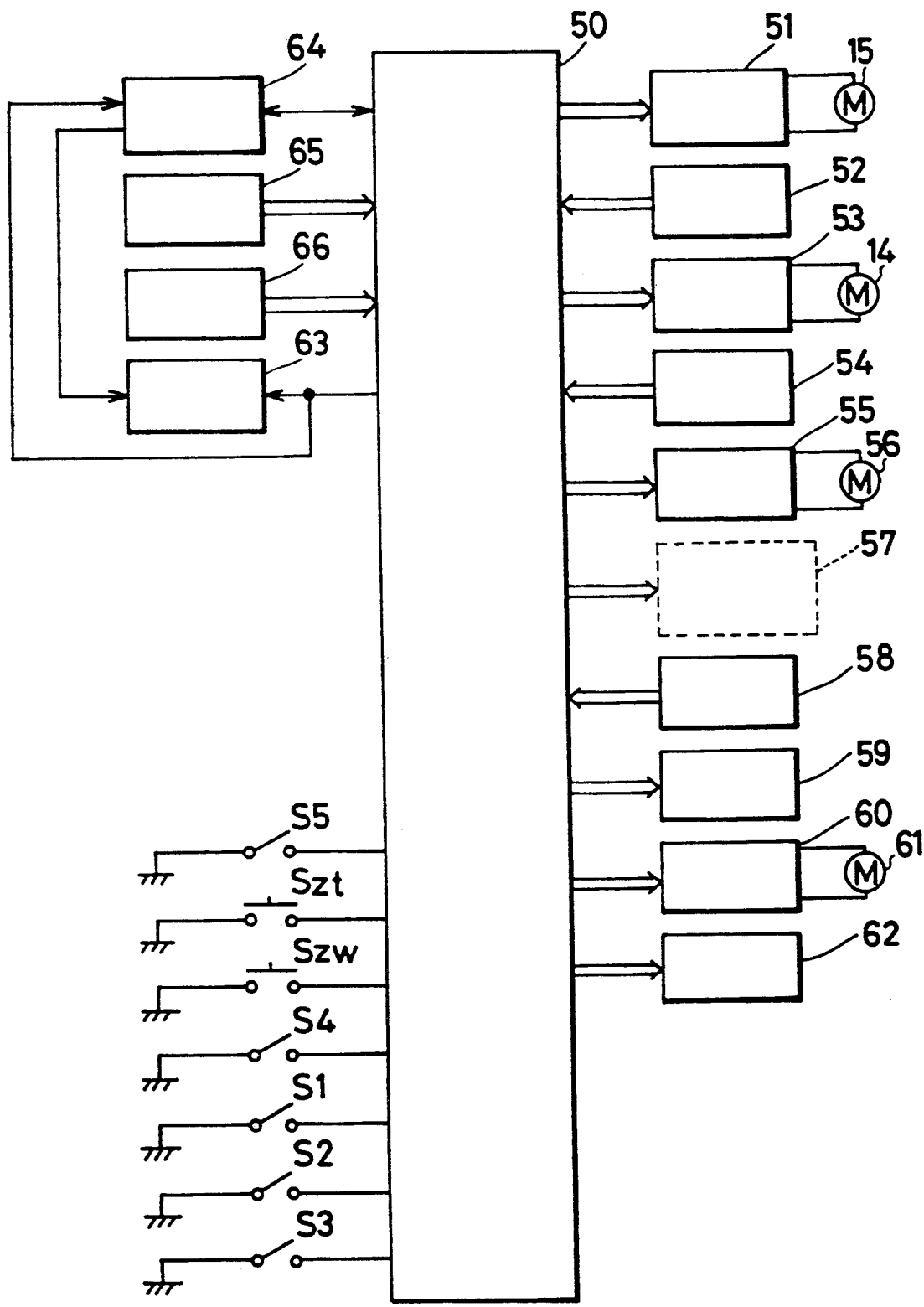
FIG. 7A is a diagram showing a control portion of the camera.

A circuit construction of the camera will be described below. In FIG. 7A showing a circuit construction of the camera, indicated at 50 is a central control unit (CPU) for performing a centralized control of driving of actuators to be described, and operation sequences and exposure calculation. Indicated at 51 is a F-motor control circuit for controlling the rotational direction and driving amount of the F-motor 15 by use of command signal. Indicated at 52 is an encoder for detecting the focal length of the viewfinder 2. Indicated at 53 is a ZL-motor control curcuit for controlling the rotational direction and driving amount of the ZL-motor 14 by use of command signal. Indicated at 54 is an encoder for detecting the focal length of the taking lens 1. Indicated at 55 is a film control curcuit for controlling a film motor 56 for advancing the film 22 every frame. Indicated at 57 is the microcomputer carried by the film container 17. Indicated at 58 is a film sensitivity read circuit for reading a film sensitivity indicated in the form of codes on the film container 17. Indicated at 59 is a display circuit for displaying a focal length set by the real or pseudo zooming, or a focal length calculated in an autoprogram mode to be described below. Indicated at 60 is a focusing control circuit for controlling a focusing lens motor 61. The focusing lens motor 61 is adopted for driving a focusing lens (not shown) of the taking lens 1.

Indicated at 62 is a shutter control circuit for controlling the opening and closing of a shutter. The shutter used in this embodiment serves as a diaphragm. As a shutter speed is determined in accordance with an exposure value, an aperture value is automatically determined. Relationship between shutter speeds and aperture values is shown in FIG. 8. In FIG. 8, a control curve A represents a case in which the focal length of the taking lens 1 is 35 mm. A control curve B represents a case in which the focal length of the taking lens 1 is 70 mm. A control curve C represents a case in which the focal length of the taking lens 1 is any one of 35 mm to 70 mm. In a region in which the shutter speed changes with the aperture value, that is, in a region in which the shutter speed is greater than 1/30 second), the control curves A, B, C have the same inclination.

Indicated at 63 is a flash unit having a zoom flash device 3. The illumination timing of the flash device 3 is controlled by the CPU 50. Indicated at 64 is a dimmer circuit. The photocell 12 receives reflected flash light from the object. The dimmer circuit 64 integrates the reflected light, and generates a stop signal to the flash unit 63 to stop the illumination of flash light when a predetermined exposure is obtained. Indicated at 65 is a light measurement circuit for measuring the brightness of the object based on natural light received by the photocell 12. Indicated at 66 is a distance measurement circuit for detecting the distance to the subject.

Figure 7B:
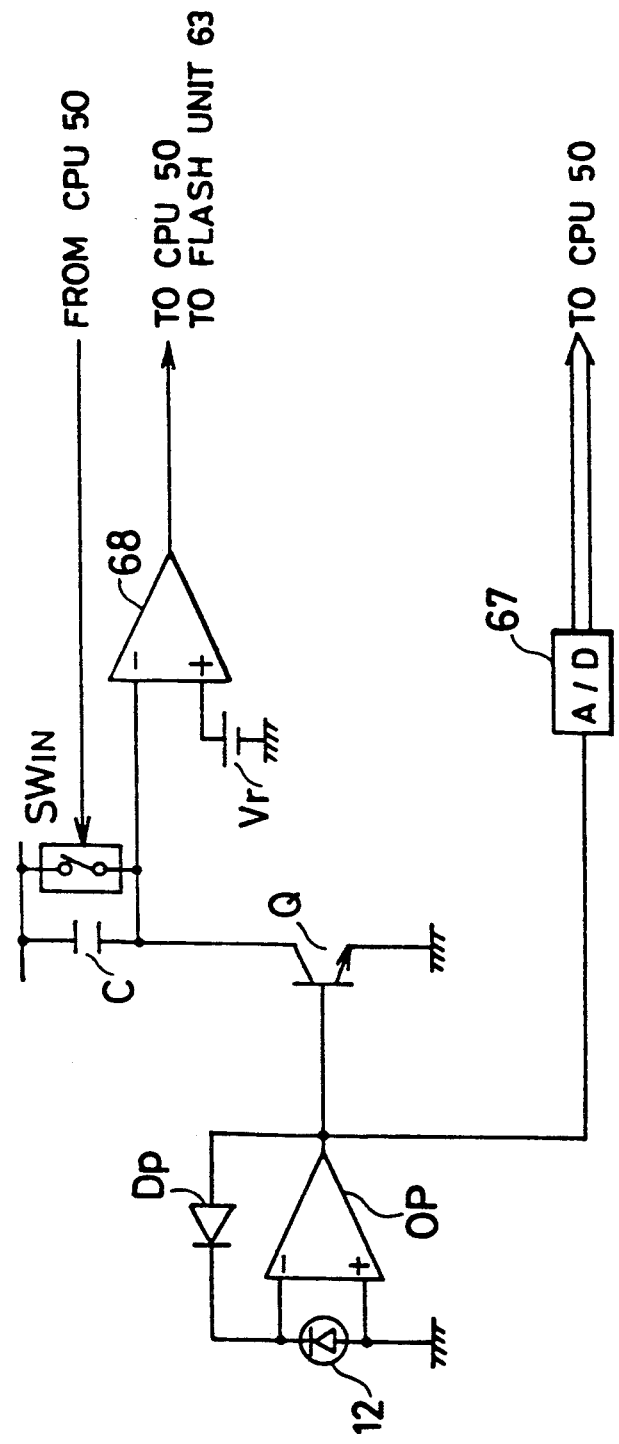
FIG. 7B is a diagram showing a construction of a dimmer and light measurement circuit.

Detailed construction of the dimmer circuit 64 and the light measurement circuit 65 will be described with reference to FIG. 7B. As shown in FIG. 7B, the dimmer circuit 64 and the light measurement circuit 65 have a common input portion. The input portion includes the photocell 12, an operation amplifier OP, a logarithmic compression diode Dp provided between the (−) input terminal and the output terminal of the operation amplifier OP. The light measurement circuit 65 consists of the input portion and an A/D converter 67, and sends the converted output to the CPU 50.

On the other hand, the dimmer circuit 64 includes a transistor Q for expanding a logarithmicly compressed output, a condensor C for charging the expanded output, a switch SW1n for allowing the condensor C to start the charging of the output when the flash light illumination is stopped, and a comparator 68 for comparing the voltage of the condensor C with a reference voltage Vr, and sending a charge complete signal to the CPU 50 when the voltage of the condensor C reaches the reference voltage Vr.

The flash unit 63 stops the illumination of flash light when the stop signal is input. The reference voltage Vr is changed in accordance with control shutter speed Tvc sent from the CPU 50. This is because of the fact that this embodiment has a lens shutter, accordingly, it is required to compensate for variation of the amount of flash light incident on a film surface per unit time in accordance with variation of the aperture area of the lens shutter. Specifically, as the control shutter speed Tvc rises (the aperture area decreases), the amount of flash light incident on the film surface per unit time decreases. Accordingly, when the control shutter speed Tvc increases, the reference voltage Vr is raised so that the stop signal is generated at a delayed time to compensate for a decrease in the amount of flash light incident on the film surface per unit time. The reference voltage Vr is changed in accordance with the sensitivity Sv of a loaded film.

Next, switches will be described. A photography ready switch S1 is turned on when a release button is pressed halfway. When the switch S1 is turned on, the light and distance measurement for photography is performed. A release switch S2 is turned on when the release button is pressed all the way. When the switch S2 is turned on, the exposure is started. A zooming mode change-over switch S3 is adopted for changing an autoprogram zooming mode to a power zooming mode and vice versa. In the autoprogram zooming mode (hereinafter referred to as APZ), it is automatically performed to determine the focal length to assure a predetermined magnification according to the distance to the object which is detected by the distance measurement circuit 66. In the power zooming mode (hereinafter referred to as PZ), a desired focal length is manually set.

A zooming reset switch S4 is turned on when the taking lens 1 is placed in an initial position, in this embodiment, the focal length of 35 mm. When photography is finished, the taking lens 1 is always returned to the initial position. Owing to the fact that the switch S4 is turned on, the initial position return of the taking lens 1 is detected.

A switch S5 is actuated by the photographer to forcibly prohibit the illumination of flash light. When the switch S5 is turned on, the illumination is prohibited.

Switches Szt and Szw are actuated by the photographer in the PZ mode to direct the driving direction of the taking lens 1. The taking lens 1 is driven to the teleward limit when the switch Szt is turned on. The taking lens 1 is driven to the wideward limit when the switch Szw is turned on.

Operation of the camera of the present invention will be described. The camera has the real zooming and pseudo zooming. The APZ mode is available in the extire range of the real zooming and pseudo zooming.

As described above, the taking lens 1 is a zoom lens whose focal length is variable from 35 mm to 70 mm. In addition, the magnification of the pseudo zooming is two. Accordingly, the camera can perform zooming from 35 mm to 140 mm. For example, when the focal length is set at 105 mm (i.e., a zooming ratio of 3), photography is executed at a focal length of 70 mm (i.e., a zooming ratio of 2) and the pseudo magnification is set at 1.5. The pseudo magnificatioin of 1.5 is recorded in the memory carried by the film container 17. The pseudo magnification is read out in the printing process, a part of the negative, usually a center portion of the negative, is enlarged to the magnification of 1.5 and then printed. Consequently, the photograph can be obtained which is identical to one obtained by a taking lens having a real focal length of 105 mm (i.e., a zooming ratio of 3).

In the APZ mode, a program zooming is performed from a focal length of 35 mm to 140 mm by use of the real zooming and the pseudo zooming. For example, in an APZ mode of a photographic magnification of about 1/60, which is usually used, a necessary focal length is calculated from a detected distance to the object. If the necessary focal length is 105 mm, the focal length of the viewfinder 2 is set at 105 mm and the photographer can see an image at a field angle corresponding to the focal length of 105 mm through the viewfinder 2. When photographing, the focal length of the taking lens 1 is set at the maximum of 70 mm and the pseudo magnification is set at 1.5. In printing process, consequently, the photograph can be obtained which is identical to one obtained by a taking lens having a real focal length of 105 mm.

It should be noted that the performing of the pseudo zooming is not limited to the focal length range exceeding the real focal length of the taking lens 1. Only the pseudo zooming may be performed. The pseudo zooming may be performed in the real focal length range. Further, depending on the brightness of the subject and the distance to the subject, the real zooming and the pseudo zooming may be selectably used to obtain a desired focal length.

As mentioned above, at the photographic magnification of about 1/60, if using only the real zooming, the APZ is executable for subjects within subject distances of 1 m to 3 m. However, if using the real zooming and the psuedo zooming, the APZ is executable for subjects within subject distances of 1 m to 5 m. Accordingly, it will be seen that the use of the real zooming and the pseudo zooming for a camera having a small photographic magnification extends the APZ executable focal length range.

Figure 9:
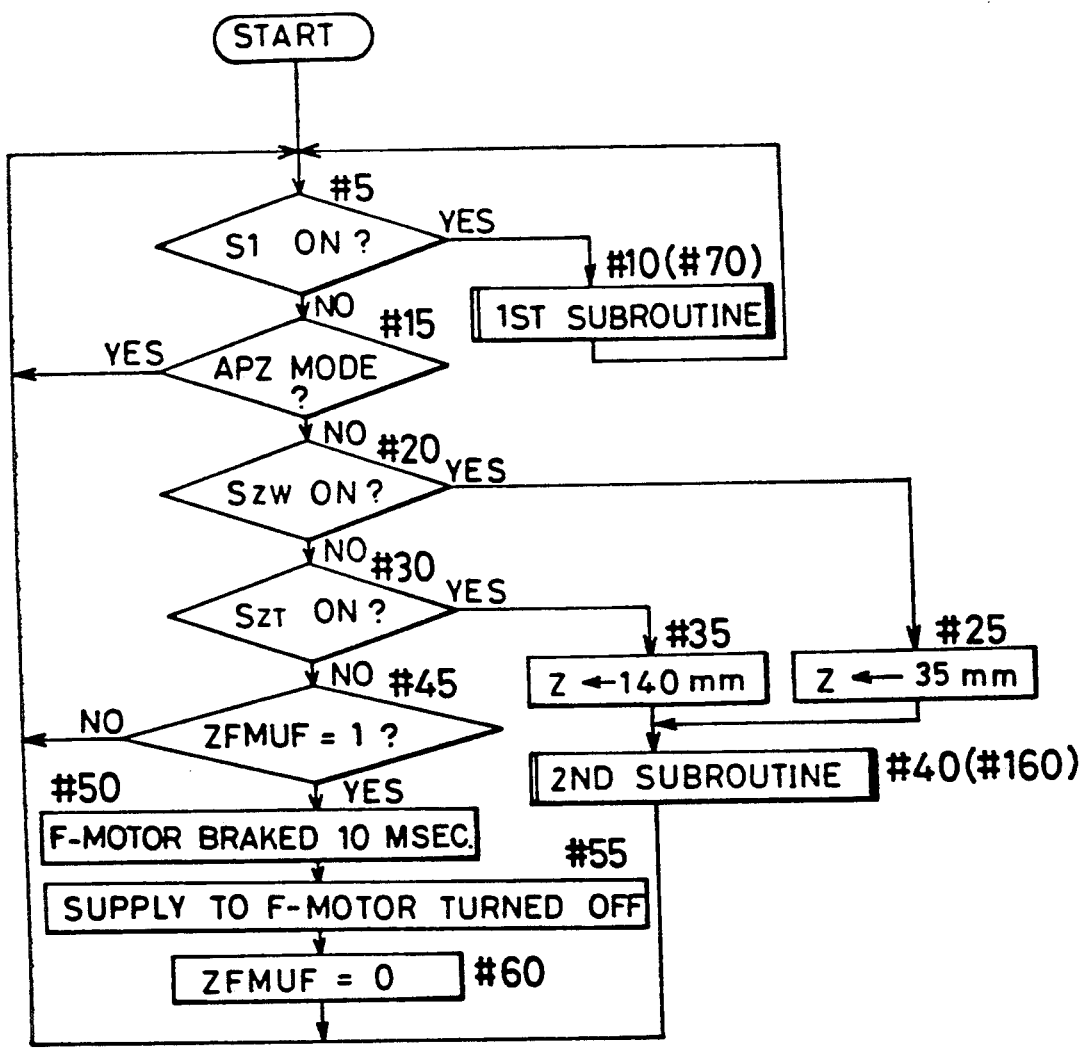
FIG. 9 is a flow chart showing a main operation routine of the camera.

Operation of the camera will be described with reference to FIGS. 9 to 16. FIG. 9 shows a main routine. When the main power switch is turned on to start the camera, in Step #5, it is discriminated whether the switch S1 is turned on. If the switch S1 is turned on, this main routine proceeds to Step #10 (#70) in which a first subroutine is executed, and then returns to Step #5.

If the switch S1 is turned off, this main routine proceeds to Step #15 in which it is discriminated whether the APZ mode is selected depending on whether the switch S3 is turned on. If the APZ mode is selected, this main routine returns to Step #5.

If the APZ mode is not selected, this main routine proceeds to Step #20 in which it is discriminated whether the switch Szw is turned on, that is, the objective lens 4 of the viewfinder 2 is moved to the wideward limit. If the switch Szw is turned on, this main routine proceeds to Step #25 in which the end focal length Z is set at 35 mm, and proceeds to Step #40 (#160) in which a second subroutine is executed, and then returns to Step #5.

If the switch Szw is not turned on, this main routine proceeds to Step #30 in which it is discriminated whether the switch Szt is turned on, that is, the objective lens 4 of the viewfinder 2 is moved to the teleward limit. If the switch Szt is turned on, this main routine proceeds to Step #35 in which the end focal length Z is set at 140 mm, and proceeds to Step #40 (#160), and then returns to Step #5.

If the switch Szt is not turned on, this main routine proceeds to Step #45 in which it is discriminated whether the F-motor 15 is driven depending on whether a flag ZFMUF is set at 1. If the F-motor 15 is driven, that is the flag ZFMUF is set at 1, this main routine proceeds to Step #50 in which the F-motor 15 is braked for 10 milliseconds, proceeding to Step #55 in which the supply to the F-motor 15 is turned off, proceeding to Step #60 in which the flag ZFMUF is set at 0, then returning to Step #5. If the F-motor 15 is not driven, that is the flag ZFMUF is not set at 1, this main routine returns to Step #5.

Figure 10:
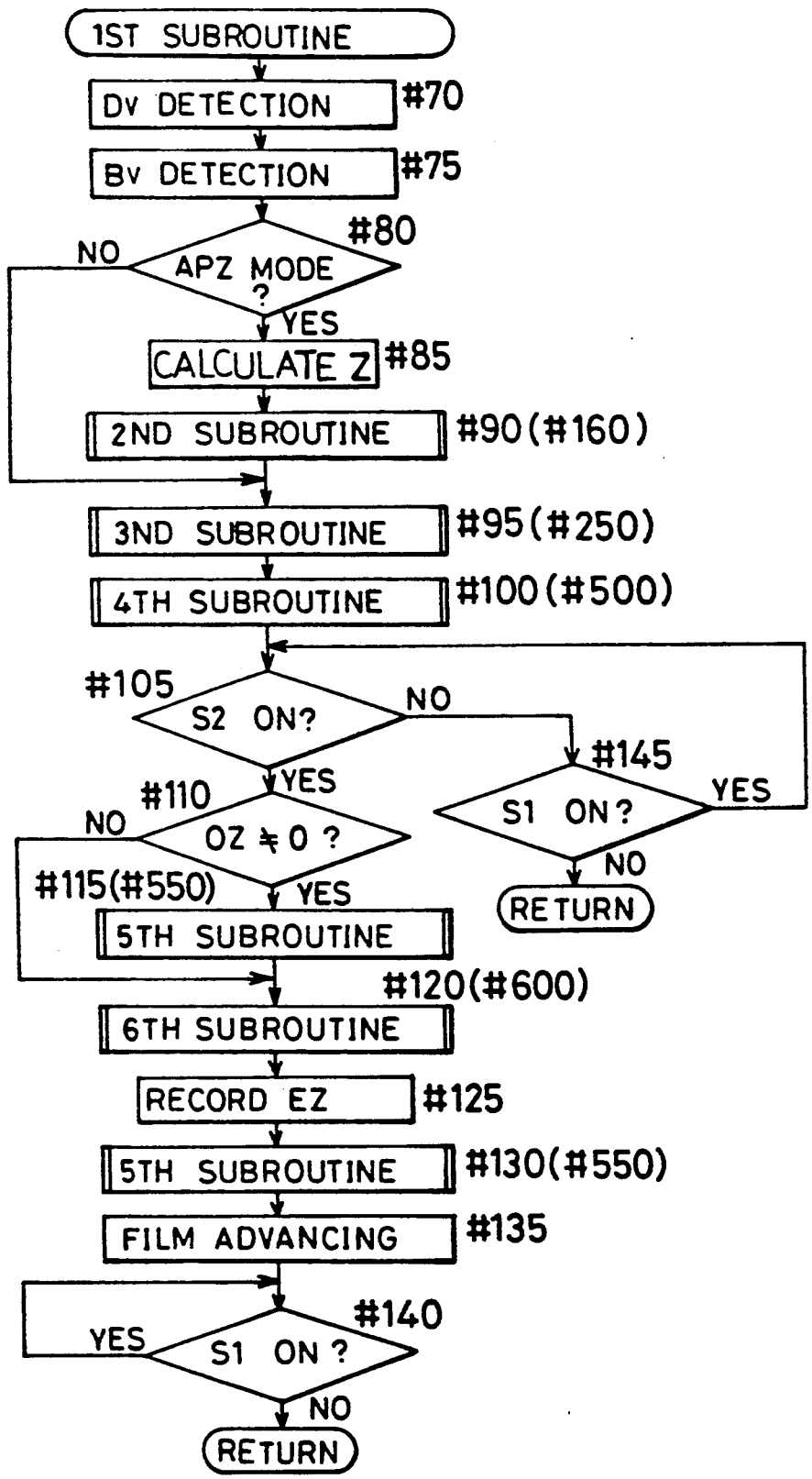
FIG. 10 is a flow chart showing a first subroutine.

The first subroutine will be described with reference to FIG. 10. In the first subroutine, the brightness of the subject is measured to calculate the exposure control value. In the APZ mode, to attain a predetermined photographic magnification, the magnification for the real zooming and the magnification for the pseudo zooming are calculated from a detected distance to the subject. After the release button is pressed, the taking lens 1 is driven to a focal length corresponding to the real zooming magnification and focused to the subject, and the exposure is finally performed based on the calculated exposure control value.

Specifically, in Steps #70, #75, the subject distance Dv and the subject brightness Bv are detected by the light measurement circuit 65 and the distance measurement circuit 66. Thereafter, this subroutine proceeds to Step #80 in which it is discriminated whether the APZ mode is selected. If the APZ mode is selected, this subroutine proceeds to Step #85 in which it is executed to calculate the end focal length Z to attain the predetermined photographic magnification based on the detected subject distance Dv. For example, this calculation is executed in accordance with the following equation:

$$Z = a \times Dv + b$$

wherein the letters a, b are constants.

Subsequently, this subroutine proceeds to Step #90 (#160) in which the second subroutine is executed to set the viewfinder 2 at such a focal length as to attain the end focal length Z.

If the APZ mode is not selected in Step #80, that is, the PZ mode is selected, this subroutine proceeds directly to Step #95 (#250).

In Step #95 (#250), a third subroutine is executed to calculate the real zooming magnification OZ, the pseudo zooming magnification EZ, and the control shutter speed Tvc. Thereafter, this subroutine proceeds to Step #100 (#500) in which a fourth subroutine is executed to display the real zooming magnification OZ or the pseudo zooming magnification EZ in the viewfinder 2, or in the display portion in the top surface of the camera. The real zooming magnification OZ and the pseudo zooming magnification EZ have values of 0 to 1 respectively. For example, a real zooming magnification OZ of 0 means that the zooming ratio of the taking lens 1 is 1, that is, the focal length of the taking lens 1 is 35 mm. A real zooming magnification OZ of 1 means that the zooming ratio of the taking lens 1 is 2, that is, the focal length of the taking lens 1 is 70 mm. Also, a pseudo zooming magnification EZ of 0 means that the pseudo magnification is 1, that is, the entire of the negative is printed. A pseudo zooming magnification EZ of 1 means that the pseudo magnification is 2, that is, a ¼ portion of the negative is enlarged two times in the printing process.

Subsequently, in Step #105, it is discriminated whether the switch S2 is turned on. If the switch S2 is turned off, this subroutine proceeds to Step #145 in which it is discriminated whether the switch S1 is turned on. If the switch S1 is turned on, this subroutine returns to Step #105. If the switch S1 is not turned on, this subroutine returns to the main routine.

If the switch S2 is turned on, this subroutine proceeds to Step #110 in which it is discriminated whether the real zooming magnification OZ is 0. If the real zooming magnification OZ is not 0, this subroutine proceeds to Step #115 (#550) in which a fifth subroutine is executed to set the taking lens 1 at such a focal length as to attain the real zooming magnification OZ. If the real zooming magnification OZ is 0, this subroutine proceeds directly to Step #120 (#600). In other words, the focal length of the taking lens 1 is held at the initial position of 35 mm.

In Step #120 (#600), a sixth subroutine is executed to expose the film at the calculated exposure control value. Thereafter, this subroutine proceeds to Step #125 in which the pseudo zooming magnification EZ is recorded in the memory 57, proceeding to Step #130 (#550) in which a seventh subroutine is executed to drive the taking lens 1 to the initial position, and proceeding to Step #135 in which the film is advanced one frame. Thereafter, this subroutine proceeds to Step #140 in which discrimination as to whether the switch S1 is turned on is repeated until the switch S1 is turned off. When the switch S1 is turned off, this subroutine returns to the main routine.

Figure 11:
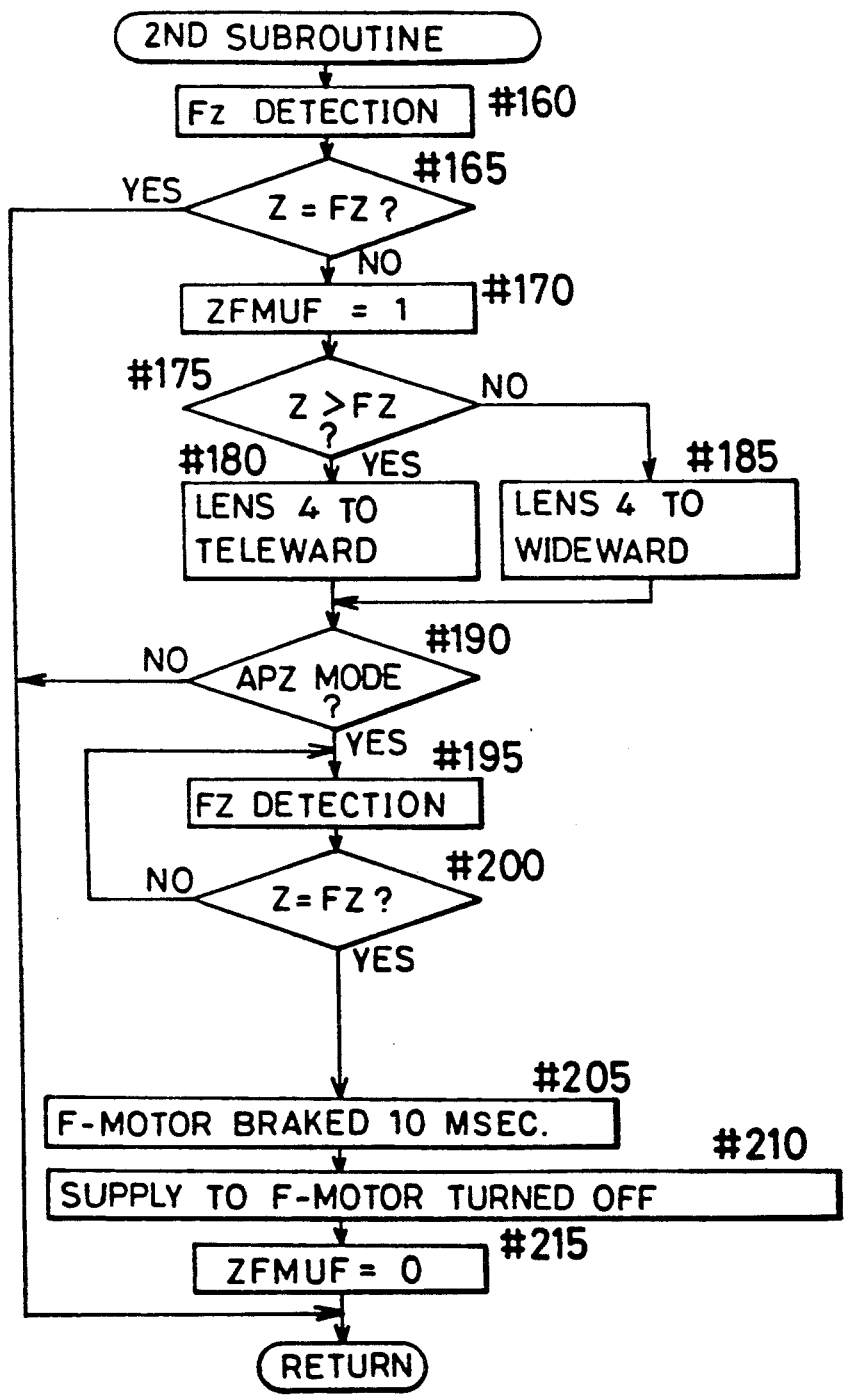
FIG. 11 is a flow chart showing a second subroutine.

Next, the second subroutine will be described with reference to FIG. 11. In this subroutine, when the PZ mode is selected, the objective lens 4 of the viewfinder 2 is moved in a directed direction. When the APZ mode is selected, the viewfinder 2 is automatically set at such a focal length as to attain the end focal length Z calculated from the subject distance Dv.

In Step #160, first, the present focal length FZ is detected by the encoder 26. Thereafter, this subroutine proceeds to Step #165 in which it is discriminated whether the present focal length FZ is equal to the end focal length Z calculated in Steps #25, #35, or Step #85.

If the present focal length FZ is equal to the end focal length Z, this subroutine returns to Step #5 of the main routine, or Step #95 of the first subroutine. Specifically, when executed in Step #40 of the main routine, i.e., in the PZ mode, this subroutine returns to Step #5 of the main routine. When executed in Step #90 of the first subroutine, i.e., in the APZ mode, this subroutine returns to Step #95 of the first subroutine.

If the present focal length FZ is not equal to the end focal length Z, this subroutine proceeds to Step #170 in which the flag ZFMUF is set at 1, and proceeds to Step #175 in which it is discriminated whether the present focal length FZ is smaller than the end focal length Z.

If the present focal length FZ is smaller than the end focal length Z, this subroutine proceeds to Step #180 in which it is started driving of the objective lens 4 of the viewfinder 2 to the teleward limit, and proceeds to Step #190. If the present focal length FZ is greater than the end focal length Z, this subroutine proceeds to Step #185 in which it is started driving of the objective lens 4 of the viewfinder 2 to the wideward limit, and proceeds to Step #190.

In Step #190, it is discriminated whether the APZ mode is selected. If the APZ mode is not selected, that is, the PZ mode is selected, this subroutine returns to Step #5 of the main routine. If the APZ mode is selected, this subroutine proceeds to Step #195 in which the present focal length FZ is detected, and proceeds to Step #200 in which it is discriminated whether the present focal length FZ is equal to the end focal length Z. This discrimination is repeated until the present focal length FZ is equal to the end focal length Z.

When the present focal length FZ is equal to the end focal length Z, this subroutine proceeds to Step #205 in which the F-motor is braked for 10 milliseconds, proceeding to Step #210 in which the supply to the F-motor 15 is turned off, proceeding to Step #215 in which the flag ZFMUF is set at 0, then returns to Step #95 of the first subroutine.

Figure 12A:
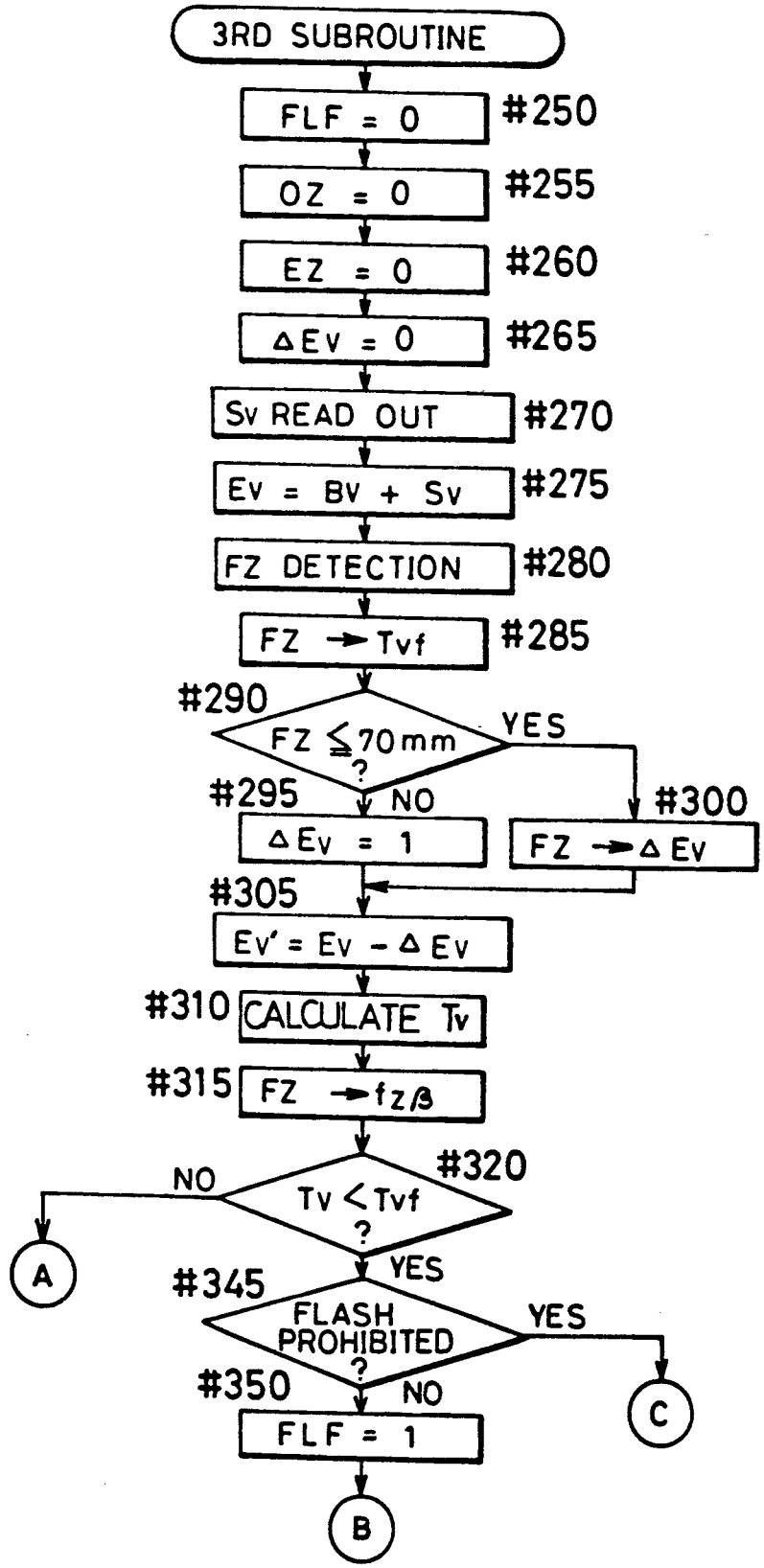
FIGS. 12A and 12B are a flow chart showing a third subroutine.
Figure 12B:
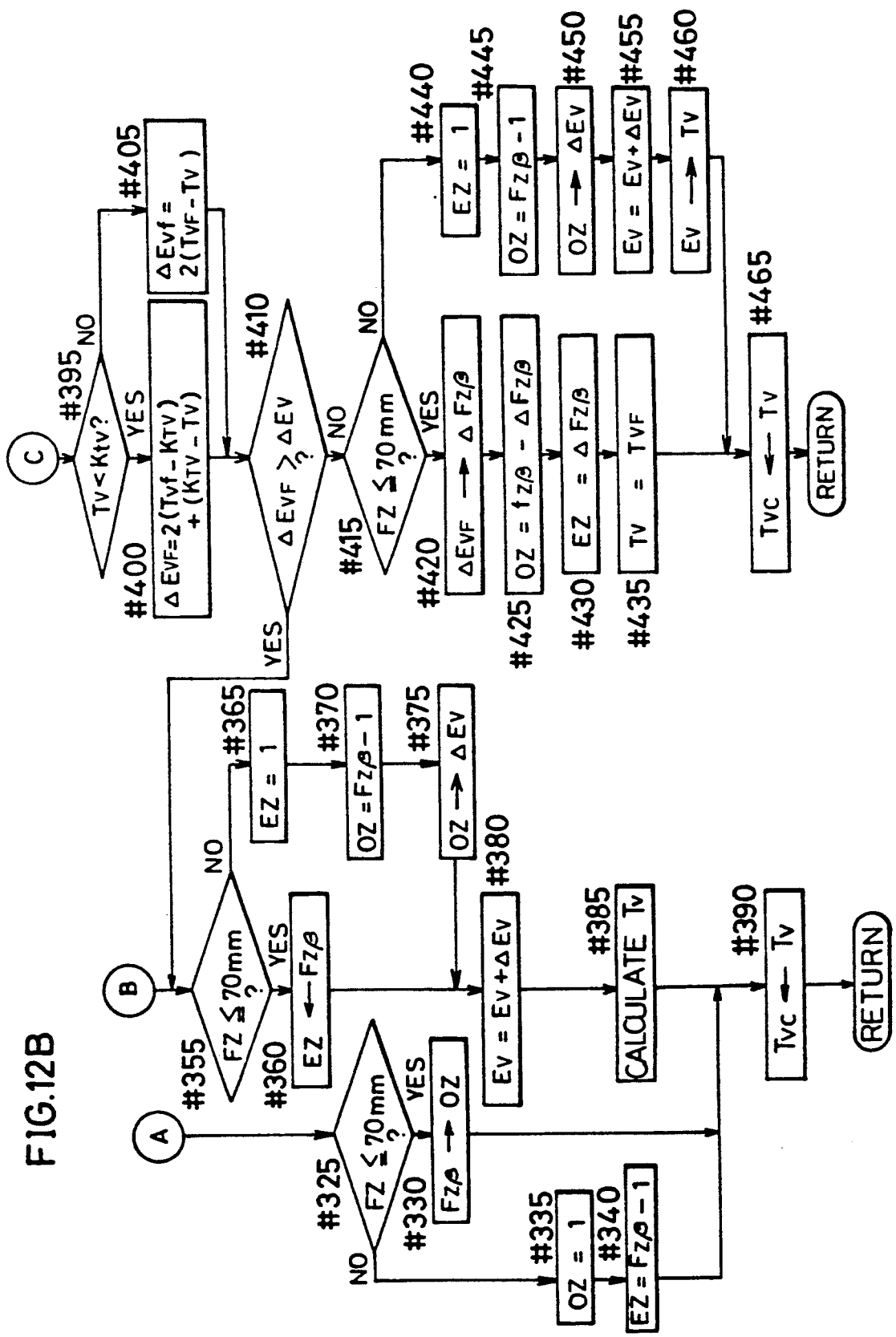

The third subroutine will be described with reference to FIGS. 12A and 12B. In this subroutine, depending on the subject distance and the subject brightness, either natural light photography mode or flash light photography mode is selected. It is executed to calculate an exposure control value for each of the natural light photography mode and the flash light photography mode, a real zooming magnification OZ, a pseudo zooming magnification EZ. Also, depending on the subject distance and the subject brightness, one of the real zooming and the pseudo zooming is given priority. When the subject is bright, the real zooming is given priority. When the subject is dark and flash light is emitted, the pseudo zooming is given priority. Further, when the subject is dark but flash light is prohibited, the real zooming and the pseudo zooming are combined in accordance with the exposure control value.

First, in Step #250, a flag FLF for showing the flash light photography is set at 0. Also, in Steps #255, #260, #265, the real zooming magnification OZ, the pseudo zooming magnification EZ, an exposure correction value $\Delta$Ev are set at 0 respectively. Thereafter, the film sensitivity Sv of the loaded film is read out by the circuit 58 in Step #270. An exposure value Ev is calculated from the film sensitivity Sv and the subjected brightness Bv detected in the Step #75 of the first subroutine, that is, $Ev = Bv + Sv$, in Step #275. The focal length FZ is detected by the encoder 26 in Step #280. The focal length FZ is set manually, or automatically in the APZ mode. In Step #285, based on the focal length FZ, a shutter speed Tvf for preventing the influence of camera shake is calculated. The shutter speed Tvf is obtained by converting the value of 1/FZ to an Apex value.

Subsequently, this subroutine proceeds to Step #290 in which it is discriminated whether the focal length FZ is smaller than or equal to 70 mm. If the focal length FZ is greater than 70 mm, this subroutine proceeds to Step #295 in which the exposure correction value $\Delta$Ev is set at 1. If the focal length FZ is smaller than or equal to 70 mm, this subroutine proceeds to Step #300 in which the exposure correction value $\Delta$Ev is set in accordance with the focal length FZ. The exposure correction value $\Delta$Ev is stored in a memory of the CPU 50 in advance.

Now, the exposure correction will be described with reference to FIG. 17. In FIG. 17, represented at A is a control curve for the focal length of 35 mm, which is a reference focal length in this embodiment. Represented at C is a control curve for an arbitrary focal length. Represented at Avo, Avo' are respectively aperture values for the control curves A, C. In this embodiment, as the focal length of the taking lens 1 varies, the aperture value varies. This variation is represented at $\Delta$Avo. When the exposure value is Ev and the focal length of the taking lens 1 is set at the reference focal length of 35 mm, the shutter speed is found out to be Tv in accordance with the control curve A. If the taking lens 1 is set to the focal length of the control curve C, the shutter speed is necessary to set at Tvc.

The shutter speed is calculated in accordance with the reference control curve A. Accordingly, it is necessary to correct the exposure value Ev in accordance with the variation of focal length to assure an appropriate exposure. Assuming that a corrected exposure value is Ev', as shown in FIG. 17, an intersection point of the reference control curve A and the corrected exposure value Ev' has the shutter speed of Tvc. In Steps #295, #300, the exposure correction value ΔEv is determined. The reason why the exposure correction value is set at 1 when the focal length FZ is greater than 70 mm is that the focal length of the taking lens 1 is set at 70 mm, and an exceeding magnification is accomplished by the pseudo zooming. As shown in FIG. 17, the exposure correction value ΔEv is equal to the aperture value variation ΔAvo. Also, it should be noted that if the f-number of the objective lens of the viewfinder varies in accordance with zooming, the aperture value variation ΔAvo may be calculated based on the f-number of the objective lens. Further, in the focal length range of 35 mm to 70 mm, the real zooming is performed and the focal length of the taking lens 1 is used as the present focal length FZ, in the focal length range greater than 70 mm, the pseudo zooming is further performed. The reason why the real zooming is given priority in the focal length range of 30 mm to 70 mm is that enlargement of a negative image inevitably lowers the quality of a printed picture.

Now, referring to the third subroutine, in Step #305, the corrected exposure value Ev' is calculated by subtracting the exposure correction value ΔEv from the exposure value calculated in Step #275. Subsequently, in Step #310, the shutter speed Tv is calculated from the corrected exposure value Ev'.

In Step #315, zooming ratio data $Fz_\beta$ is calculated based on the present focal length FZ. The zooming ratio data $Fz_\beta$ has the same functional meaning as the real zooming magnification OZ and the pseudo zooming magnification EZ. The zooming ratio data $Fz_\beta$ is settable at 0 to 2 depending on the focal length FZ. For example, if the focal length FZ is 35 mm, the zooming ratio data $Fz_\beta$ is set at 0. If the focal length FZ is 70 mm, the zooming ratio data $Fz_\beta$ is set at 1. If the focal length FZ is 140 mm, the zooming ratio data $Fz_\beta$ is set at 2.

This subroutine proceeds to Step #320 in which it is discriminated whether the shutter speed Tv is smaller than the shake prevention shutter speed Tvf. If the shutter speed Tv is not smaller than the shake prevention shutter speed Tvf, this subroutine proceeds to Step #325 in which it is discriminated whether the focal length FZ is smaller than or equal to 70 mm. If the focal length FZ is smaller than or equal to 70 mm, this subroutine proceeds to Step #330 in which the zooming ratio data $Fz_\beta$ is used as the real zooming magnification OZ to cause only the real zooming to perform, and proceeds to Step #390. If the focal length FZ is greater than 70 mm, this subroutine proceeds to Step #335 in which the real zooming magnification OZ is at 1, and then proceeds to Step #340 in which the pseudo zooming magnification EZ is calculated and set by subtracting 1 from the zooming ratio data $Fz_\beta$, i.e., $EZ = Fz_\beta - 1$, to cause the real zooming magnification to set at the maximum magnification of 2, and cause the pseudo zooming to perform to attain the remaining magnification, and proceeds to Step #390. In Step #390, the shutter speed Tv is set as the control shutter speed Tvc. Thereafter, this subroutine returns to Step #100 of the first subroutine.

On the other hand, if the shutter speed Tv is smaller than the shutter speed Tvf, this subroutine proceeds to Step #345 in which it is discriminated whether the flash light prohibition mode is selected depending on whether the switch S5 is turned on, or the flash condensor is charged. If the flash light prohibition mode is not selected, this subroutine proceeds to Step #350 in which the flag FLF is set at 1 to permit the flash light emission, and proceeds to Step #355 in which it is discriminated whether the focal length FZ is smaller than or equal to 70 mm. If the focal length FZ is smaller than or equal to 70 mm, this subroutine proceeds to Step #360 in which the zooming ratio data $Fz_\beta$ is used as the pseudo zooming magnification EZ to cause only the pseudo zooming to perform, and proceeds to Step #380 in which the exposure correction value ΔEv is added to the corrected exposure value Ev' calculated in Step #305 to obtain the exposure value Ev calculated in Step #275. This is because of the fact that even if the focal length FZ is smaller than 70 mm, the real zooming is not performed. Thereafter, this subroutine proceeds to Step #385 in which the shutter speed Tv is calculated based on the exposure value Ev, and proceeds to Step #390 in which the shutter speed Tv is set as the control shutter speed Tvc, and returns to Step #100 of the first subroutine.

If the focal length FZ is greater than 70 mm, this subroutine proceeds to Step #365 in which the pseudo zooming magnification EZ is at 1, and then proceeds to Step #370 in which the real zooming magnification OZ is calculated and set by subtracting 1 from the zooming ratio data $Fz_\beta$, i.e., $OZ = Fz_\beta - 1$. This causes the pseudo zooming magnification to set at the maximum magnification of 2, and cause the real zooming to perform to attain the remaining magnification, and proceeds to Step #375 in which the exposure correction value ΔEv is calculated from the real zooming magnification OZ, and proceeds to Step #380.

In the flash light photography, the pseudo zooming is given priority in order to make the focal length of the taking lens 1 as short as possible, and decrease the aperture value Av (i.e., increase the opening diameter of the aperture diaphragm) to increase the flash light coverage range. In the case of mounting a flash unit having a guide number Gno of 15 on the camera carrying the zoom taking lens 1 having the focal length range of 35 mm to 70 mm and the f-number of 4.0 to 5.6, when the focal length is 35 mm, the flash light coverage range is 3.8 m, when the focal length is 70 mm, the flash light coverage range is 2.7 m. Accordingly, in the case that photography is performed at a zooming ratio of 2, the flash light coverage range is expanded 1.4 times owing to the fact that the priority is given to the pseudo zooming. Also, in the case of the object is bright, i.e., Tv>Tvf, the priority is given to the real zooming. However, it may be appropriate to give the priority to the pseudo zooming in the case that even if the object is bright, flash light is emitted to eliminate the influence of backlight.

As described above, in the flash light photography mode, the control shutter speed Tvc is determined based on the natural light. Accordingly, there is a likelihood that the emission of flash light causes over exposure. Also, there is a likelihood that if the object is dark, the control shutter speed Tvc is under the shake prevention shutter speed Tvf. However, these likelihoods are not important as mentioned below.

In a camera capable of providing a pseudo print format, the effect of the pseudo zooming is not obtainable until printing is executed. Accordingly, it is usual to use a negative film. The negative film have a wide latitude, particularly wide in the over or bright side. Also, it is possible to correct the exposure when a print is made from the negative. Accordingly, it will be seen that the over-exposure is not important or problem. On the contrary, the over-exposure can improve the granularity of the film. It can be said that a reasonable over-exposure may be desirable for the camera capable of providing a pseudo print format.

There will be described a case in which the object is very dark, and the control shutter speed Tvc becomes smaller than the shutter speed Tvf. In this case, the emission time of flash light is very short. Accordingly, a major object can be exposed without receiving the influence of camera shake. In other words, it is possible to obtain the same effect as slow synchronized photography.

Now returning to the third subroutine, in Step #345, if the flash light prohibition mode is selected, this subroutine proceeds to Step #395 in which it is discriminated whether the shutter speed Tv calculated in Step #310 is smaller than the limit shutter speed Ktv. If the shutter speed Tv is greater than the limit shutter speed Ktv, this subroutine proceeds to Step #405 in which a difference ΔEvf is calculated in accordance with the following equation;

$$\Delta Evf = 2(Tvf - Tv)$$

and proceeds to Step #410.

On the other hand, if the shutter speed Tv is smaller than the limit shutter speed Ktv, a difference ΔEvf is calculated in accordance with the following equation;

$$\Delta Evf = 2(Tvf - Tv) + (Ktv - Tv)$$

and proceeds to Step #410.

The limit shutter speed Ktv is a limit value beyond which the aperture value and the shutter speed can be controlled together, i.e., the shutter speed in the bending point of the control curve. As shown in FIG. 8, the limit shutter speed Ktv of this embodiment is 1/30 second (the APEX value is 5).

Figure 18A:
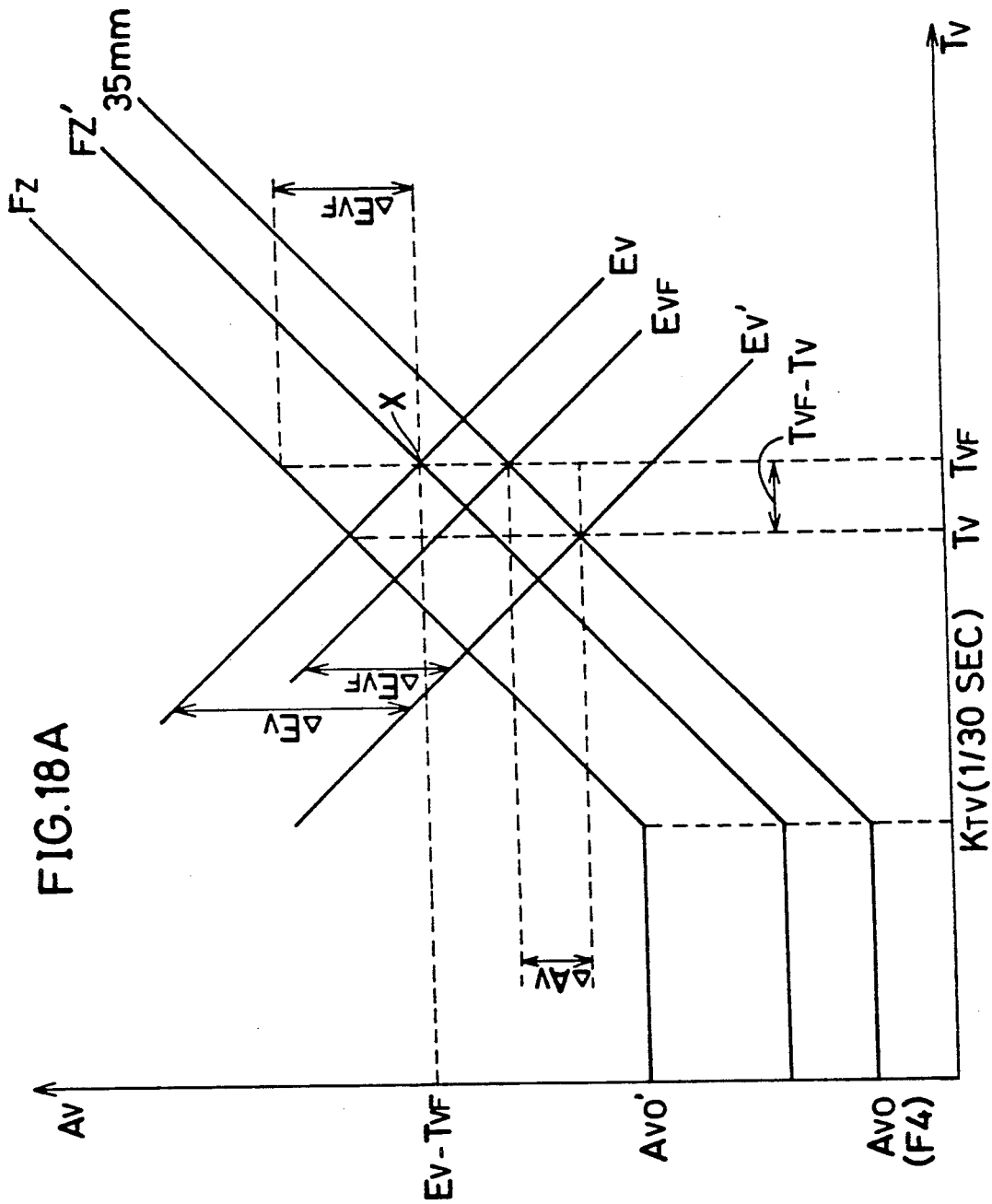
FIGS. 18A and 18B are diagrams showing exposure corrections in the case of performing natural light photography at a low brightness.
Figure 18B:
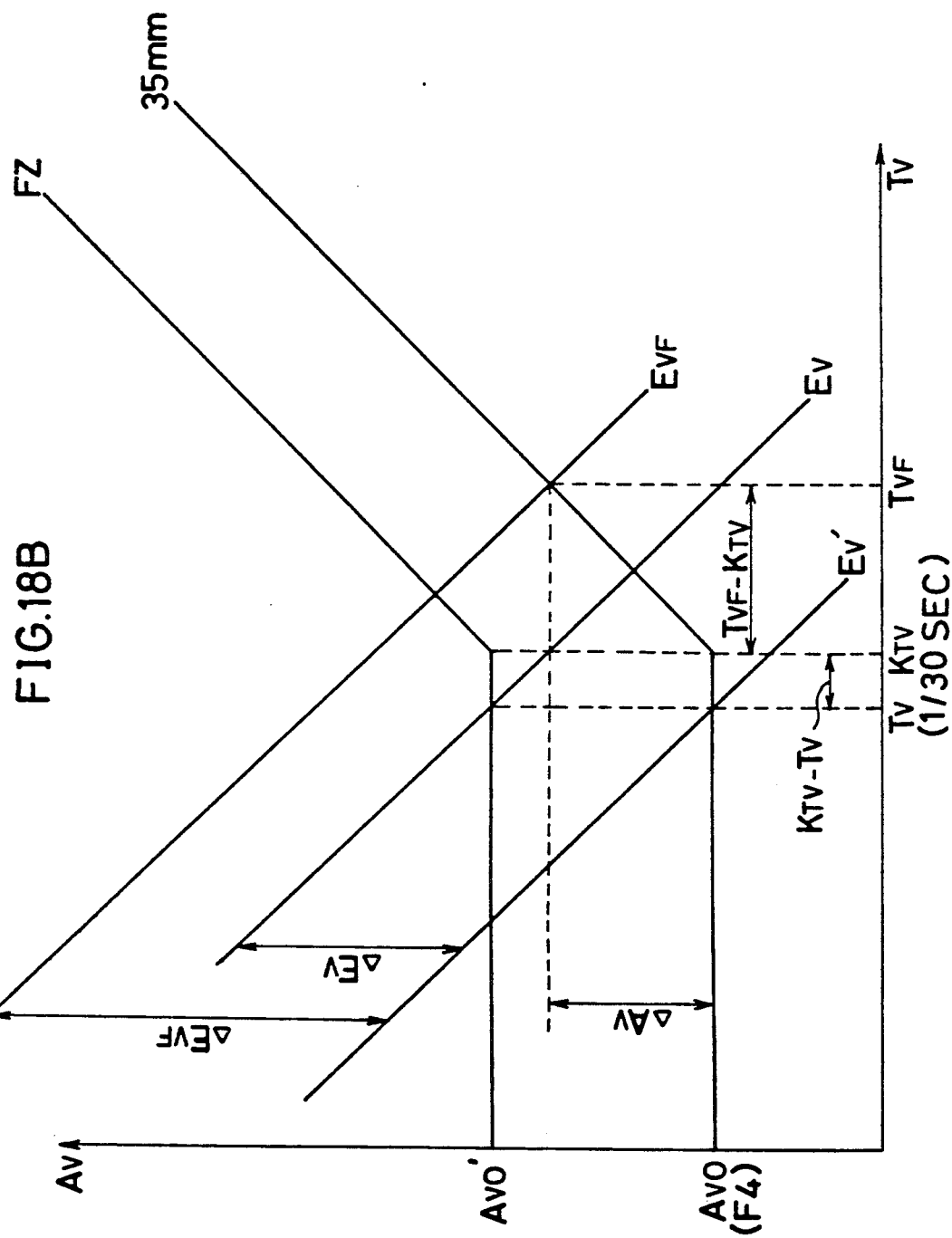

Referring to FIGS. 18A, 18B, the case in which the natural light photography is performed at low brightness. FIG. 18A shows a case in which the shutter speed Tv is greater than or equal to the limit shutter speed Ktv, and the difference ΔEvf is smaller than or equal to ΔEv. FIG. 18B shows another case in which the shutter speed Tv is smaller than the limit shutter speed Ktv, and the difference ΔEvf is greater than ΔEv., 18B. Represented at Ev is the exposure value calculated in Step #305. Represented at Ev' is the corrected exposure value in Step #305. Also, the minumum focal length of the camera is 35 mm. The shake prevention shutter speed Tvf calculated in Step #285 can be expressed by as inverse number of the focal length. Accordingly, the following equation can be obtained:

$$Tvf > \log_2 35 > \log_2 30 = Ktv$$

If the shutter speed Tv is greater than or equal to the limit shutter speed Ktv, as seen from FIG. 18A, the difference ΔEvf between the corrected exposure value Ev' and the shake prevention exposure value Evf can be expressed as follows:

$$\Delta Evf = (Tvf - Tv) + \Delta Av$$

wherein ΔAv is a difference between the aperture value at the shutter speed Tvf and the aperture value at the shutter speed Tv. As described with reference to FIG. 8, the aperture value variation relative to the exposure value variation is equal to the shutter speed variation relative to the exposure value variation. Therefore, the following equation can be expressed:

$$\Delta Av = (Tvf - Tv)$$

Accordingly, the following equation used in Step #405 is obtainable:

$$\Delta Evf = 2(Tvf - Tv)$$

On the other hand, if the shutter speed Tv is smaller than the limit shutter speed Ktv, as seen from FIG. 18B, the difference ΔEvf can be expressed as follows:

$$\Delta Evf = (Tvf - Ktv) + (Tv - Ktv) + \Delta Av$$

Also, similarly to the preceding case, the following equation can be expressed:

$$\Delta Av = (Tvf - Ktv)$$

Accordingly, the following equation used in Step #400 is obtainable:

$$\Delta Evf = 2(Tvf - Ktv) + (Ktv - Tv)$$

Next, there will be described the relationship between the exposure correction value ΔEv calculated in Steps #295, #300 and the difference ΔEvf calculated in Steps #400, #405.

The fact that the difference ΔEvf is equal to or smaller than the exposure correction value ΔEv means that the corrected exposure value Ev' obtained in Step #290 is so great as to receive the influence of camera shake. In other words, since the priority is given to the real zooming, it is likely to receive the influence of camera shake. Accordingly, it will be seen that if the pseudo zooming is increasedly performed, the influence of camera shake can be eliminated, and proper exposure is obtainable. In other words, as shown in FIG. 18A, if the focal length of the taking lens 1 is set under FZ', the shutter speed at which the object can be properly exposed is greater than Tvf, so that the influence of camera shake can be eliminated.

On the other hand, in the case in which the difference ΔEvf is greater than the exposure correction value ΔEv, as seen from FIG. 18B, if the shutter speed is set at the shake prevention shutter speed Tvf, the exposure is under the necessary amount even if the aperture value is decreased without performing the real zooming. In other words, the influence of camera shake is received even if the priority is given to the pseudo zooming.

Returning to the third subroutine, the case will be described in detail in which the natural light photography is performed at low brightness.

After the exposure difference ΔEvf is calculated in Step #400 or #405, this subroutine proceeds to Step #410 in which it is discriminated whether the exposure difference ΔEvf is greater than the exposure correction value ΔEv. If the exposure difference ΔEvf is greater than the exposure correction value ΔEv, i.e., the influence of camera shake is received even if the priority is given to the pseudo zooming, this subroutine proceeds to Steps #355 to #390 in which the magnifications OZ, EZ are set with the priority being given to the pseudo zooming, and the control shutter speed Tvc is calculated, as described above. Consequently, the object can be properly exposed while preventing the influence of camera shake as much as possible.

On the other hand, if the exposure difference ΔEvf is not greater than the exposure correction value ΔEv, i.e., the influence of camera shake can be prevented and proper exposure can be obtained if the pseudo zooming is increasedly performed, this subroutine proceeds to Step #415 in which the focal length FZ is smaller than or equal to 70 mm. If the focal length FZ is smaller than or equal to 70 mm, this subroutine proceeds to Step #420 in which a zooming ratio correction data $\Delta Fz_\beta$ is calculated based on the exposure difference ΔEvf. The zooming ratio correction data $\Delta Fz_\beta$ is stored in a memory of the CPU 50, the exposure difference ΔEvf is read out as an address. Subsequently, this subroutine proceeds to Step #425 in which the difference between the zooming ratio data $Fz_\beta$ and the zooming ratio correction data $\Delta Fz_\beta$ is set as the real zooming magnification data OZ, and proceeds to Step #430 in which the zooming ratio correction data $\Delta Fz_\beta$ is set as the pseudo zooming magnification EZ, and proceeds to Step #435 in which the shake prevention shutter speed Tvf is set as the shutter speed Tv, and proceeds to Step #465 in which the shutter speed Tv is set as the control shutter speed Tvc, and returns to Step #100 of the first subroutine. It should be noted that the zooming ratio data of $(Fz_\beta - \Delta Fz_\beta)$ used in Step #425 corresponds to the focal length FZ' shown in FIG. 18A.

If the focal length FZ is greater than 70 mm in Step #415, this subroutine proceeds to Steps #440 in which the pseudo zooming magnification EZ is at 1, and then proceeds to Step #445 in which the real zooming magnification OZ is calculated and set by subtracting 1 from the zooming ratio data $Fz_\beta$, i.e., $OZ = Fz_\beta - 1$. Thereafter, this subroutine proceeds to Step #450 in which the exposure correction value ΔEv is calculated from the real zooming magnification OZ, and proceeds to Step #455 in which the exposure correction value ΔEv is added to the corrected exposure value Ev' to obtain the exposure value Ev. Thereafter, this subroutine proceeds to #460 in which the shutter speed Tv is calculated based on the exposure value Ev, and proceeds to Step #465 in which the shutter speed Tv is set as the control shutter speed Tvc, and returns to Step #100 of the first subroutine.

Below will be described the reason why the zooming ratio data and the control shutter speed Tvc are calculated with the priority being given to the pseudo zooming, when the exposure difference ΔEvf is equal to or smaller than the exposure correction value ΔEv, and the focal length FZ is greater than 70 mm. As described above, if the exposure difference ΔEvf is equal to or smaller than the exposure correction value ΔEv, the object can be properly exposed without receiving the influence of camera shake by increasing the use of the pseudo zooming. However, there are limits in the real zooming and the pseudo zooming. Specifically, the real zooming has the focal length range of 35 mm to 70 mm, the pseudo zooming has the pseudo magnification of 2. Therefore, even if the exposure difference ΔEvf is equal to or smaller than the exposure correction value ΔEv, when the focal length FZ is greater than 70 mm, it is difficult to properly expose the object without receiving the influence of camera shake. For example, in the case that the focal length FZ' of the taking lens to assure proper exposure at the shutter speed Tvf is 50 mm (see FIG. 18A), if photography is executed at a focal length FZ smaller than or equal to 100 mm, it is possible to obtain proper exposure without receiving the influence of camera shake by setting the focal length of the taking lens at 50 mm and compensating for the deficient magnification by the pseudo zooming. However, if the focal length FZ is greater than 100 mm, the maximum magnification of the pseudo zooming is 2. Therefore, the focal length of the taking lens must be greater than 50 mm for the real zooming. For example, if the focal length FZ is 120 mm, the focal length of the taking lens 1 must be equal to or greater than 60 mm. For this reason, the influence of camera shake is likely to be received to assure proper exposure. Accordingly, even if the exposure difference ΔEvf is equal to or smaller than the exposure correction value ΔEv, when the focal length FZ is greater than 70 mm, the zooming ratio data and the control shutter speed Tvc are calculated with the priority being given to the pseudo zooming.

Also, it will be seen that when the shutter speed Tvf is greater than the shutter speed Tv, and the focal length FZ is greater than 70 mm, the zooming control and the exposure control are identical to the case that the exposure difference ΔEvf is equal to or smaller than the exposure correction value ΔEv, and the focal length FZ is greater than 70 mm, except for the discrimination as to whether flash light is emitted. Accordingly, this leads a simplified software preparation, a reduced number of parts, and a smaller size of memory.

In this embodiment, in Step #415, it is discriminated whether the exposure difference ΔEvf is equal to or smaller than the exposure correction value ΔEv. However, it may be possible that the focal length FZ' is calculated based on the exposure difference ΔEvf, and it is discriminated whether the focal length FZ is greater than 2FZ' which is the product of the FZ' and the maximum pseudo zooming magnification of 2. If the focal length FZ is equal to or smaller than 2FZ', the subroutine proceeds to Step #420 and subsequent steps. If the focal length FZ is greater than 2FZ', the subroutine proceeds to Step #440 and subsequent steps. Consequently, it will be seen that when the flash light photography is not required, photographs of improved quality can be obtained by giving the priority to the pseudo zooming as much as possible, and thus preventing the influence of camera shake.

Figure 14:
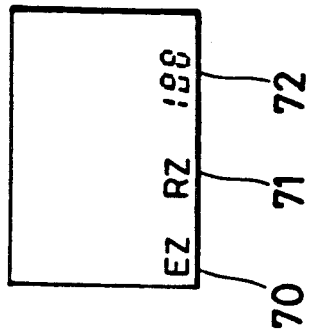
FIG. 14 is a diagram showing a display pattern in the viewfinder.
Figure 13:
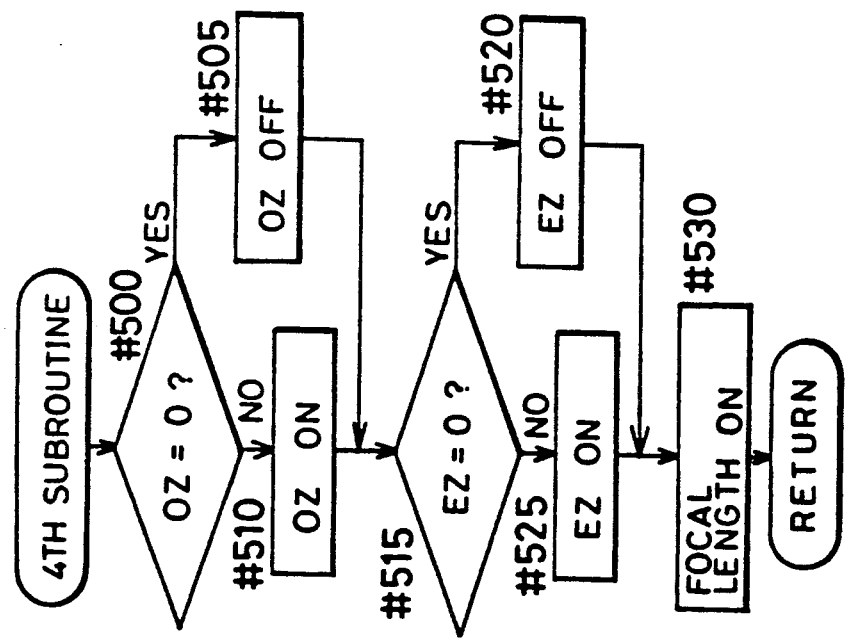
FIG. 13 is a flow chart showing a fourth subroutine.

There will be described the fourth subroutine with reference to FIG. 13. The display is performed in the viewfinder 2. A display pattern shown in FIG. 14 is produced in the finder field unit 11. In FIG. 14, a representation 70 means that the pseudo zooming is being performed. A representation 71 means that the real zooming is being performed. A set focal length is displayed in a representation portion 72.

First, in Step #500, it is discriminated whether the real zooming magnification OZ set in the third subroutine is equal to 0. If the real zooming magnification OZ is equal to 0, this subroutine proceeds to Step #505 in which the representation OZ is lighted off, and proceeds to Step #515. If the real zooming magnification OZ is not equal to 0, this subroutine proceeds to Step #510 in which the representation OZ is lighted on, and proceeds to Step #515 in which it is discriminated whether the pseudo zooming magnification EZ is equal to 0. If the pseudo zooming magnification EZ is equal to 0, this subroutine proceeds to Step #520 in which the representation EZ is lighted off, and proceeds to Step #530. If the pseudo zooming magnification EZ is not equal to 0, this subroutine proceeds to Step #525 in which the representation EZ is lighted on, and proceeds to Step #530 in which a set focal length is displayed in the representation portion 72, and return to Step #105 of the first subroutine. Also, it may be appropriate that a display portion such as an LCD panel may be provided in an outside surface of the camera, e.g., a top surface, to display the representations OZ, EZ, the focal length and the like.

Figure 15:
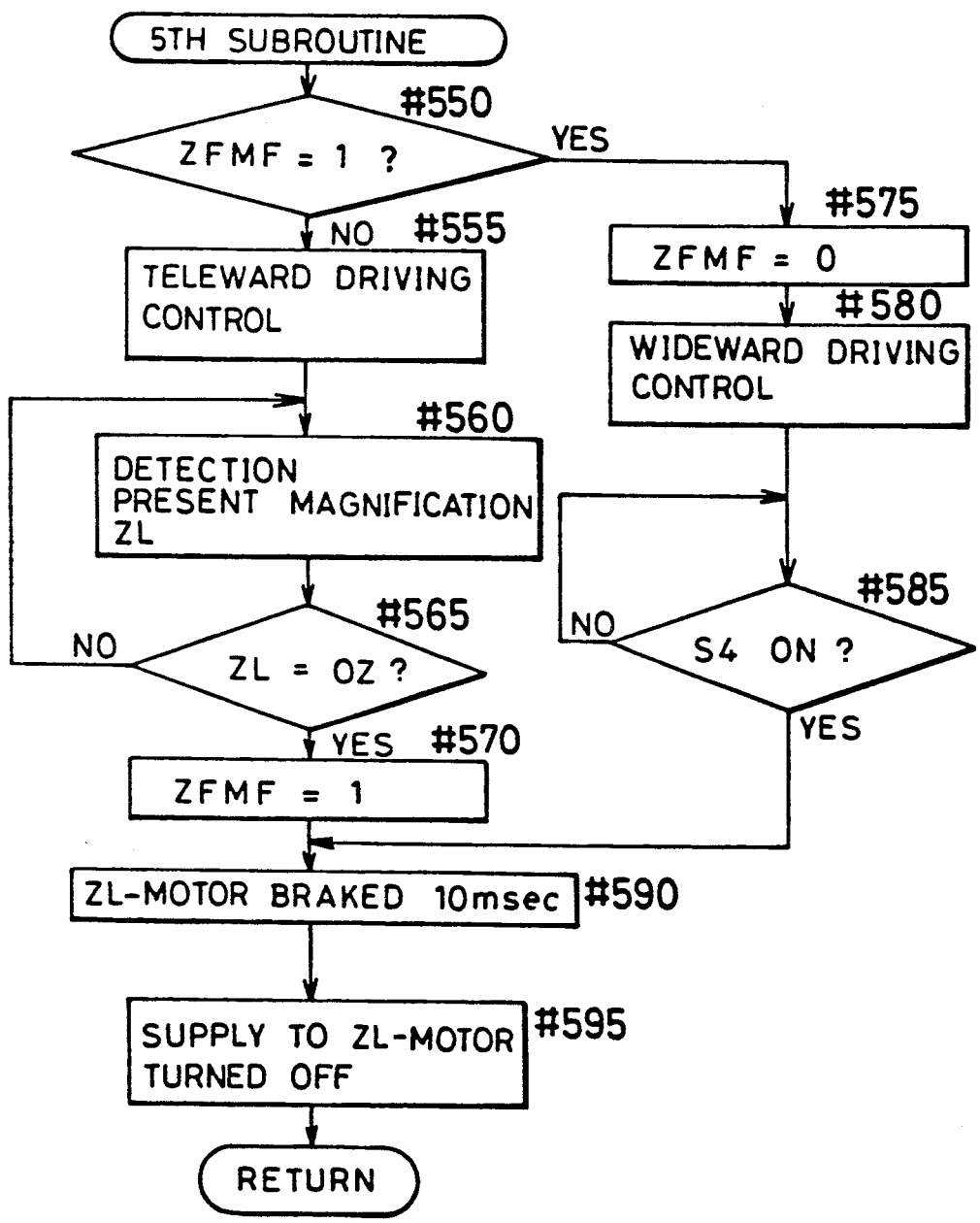
FIG. 15 is a flow chart showing a fifth subroutine.

Next, the fifth subroutine will be described with reference to FIG. 15. In the fifth subroutine, the ZL-motor 14 is driven based on the real zooming magnification OZ and the taking lens 1 is set at a predetermined focal length.

First, in Step #550, it is discriminated whether the flag ZFMF is set at 1. The case that the flag ZFMF is set at 1 means that the taking lens 1 has been driven and is not set in the initial position, and corresponds to Step #130 of the first subroutine. The case that the flag ZFMF is not set at 1 means that the taking lens 1 has not been driven and is set in the initial position, and corresponds to Step #115 of the first subroutine.

If the flag ZFMF is not at 1, that is the case of Step #115 of the first subroutine, this subroutine proceeds to Steps #555 in which the ZL-motor 14 is driven in the clockwise direction to move the taking lens 1 to the teleward limit. At the same time, in Step 560, the present magnification ZL (present focal length) of the taking lens 1 is detected by the encoder 54, and in Step #565, it is discriminated whether the present magnification ZL is equal to the real zooming magnification OZ. The ZL-motor 14 is driven until the present magnification ZL agrees with the real zooming magnification OZ.

When the present magnification ZL agrees with the real zooming magnification OZ, this subroutine proceeds to Step #570 in which the flag ZFMF is set at 1. Subsequently, in Step #590, the ZL-motor 14 is braked for 10 msec. Then, the power supply to the ZL-motor 14 is turned off in Step #595 and this subroutine returns to Step #120 of the first subroutine.

If the flag ZFMF is set at 1, that is the case of Step #130 of the first subroutine, this subroutine proceeds to Steps #575 in which the flag ZFMF is set at 0, and proceeds to Step #580 in which the ZL-motor 14 is driven in the counterclockwise direction to move the taking lens 1 to the wideward limit, and in Step #585, it is discriminated whether the switch S4 is turned on, that is, whether the taking lens 1 reach the initial position. The ZL-motor 14 is driven until the switch S4 is turned on.

If the switch S4 is turned on in Step #585, this subroutine proceeds to Step #590 in which the ZL-motor 14 is braked for 10 msec, and proceeds to Step #595 and returns to Step #135 of the first subroutine.

Figure 16:
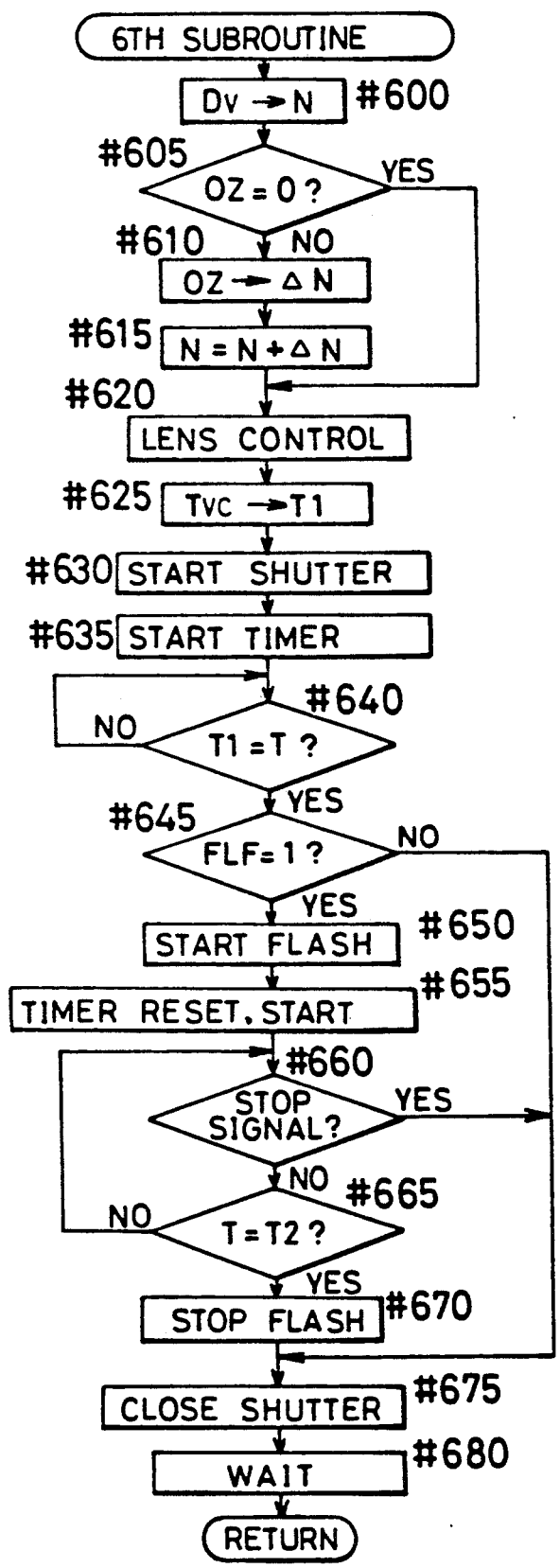
FIG. 16 is a flow chart showing a sixth subroutine.

The sixth subroutine will be described with reference to FIG. 16. In the sixth subroutine, the focusing is executed, and the exposure is performed on the film surface based on the exposure value calculated in the third subroutine. In the flash light photography, the control of the flash unit is carried out.

In Step #600 first, the driving amount N of the focusing lens from the initial position is calculated based on the object distance Dv. The driving amount N is stored in the memory of the CPU 50 with corresponding to the object distance Dv, and is read out with the object distance Dv serving as an address. Subsequently, this subroutine proceeds to Step #605 in which it is discriminated whether the real zooming magnification OZ is equal to 0. If the real zooming magnification OZ is equal to 0, this subroutine proceeds to Step #620 in which the focusing motor 61 is driven based on the driving amount N to adjust the focusing of the taking lens 1.

If the real zooming magnification OZ is not equal to 0, the correction amount $\Delta N$ is calculated based on the real zooming magnification OZ, and proceeds to Step #615 in which the corrected driving amount N' is obtained by adding the correction amount $\Delta N$ to the driving amount N. In Step #620, the focusing motor 61 is driven based on the corrected driving amount N'. It should be noted that the correction amount $\Delta N$ is a variation of the driving amount N caused by the variation of the focal length.

Subsequently, in Step #625, a time T1 (sec) for closing the shutter is calculated based on the control shutter speed Tvc (exposure value EV). The time T1 is stored in the memory of the CPU 50 with corresponding to the control shutter speed Tvc, and is read out with the control shutter speed Tvc serving as an address.

When the time T1 for exposure control is set, the shutter is opened in Step #630 and a timer T is started to count down the time T1 in Step #635. In Step #640, it is discriminated whether the timer T reaches the time T1. When the counting down of the timer T reaches the time T1, this subroutine proceeds to Step #645 in which it is discriminated whether the flag FLF is set at 1. If the flag FLF is set at 0, that is the case that the flash light photography is not selected, this subroutine proceeds to Step #675 in which a command signal for closing the shutter is generated, and proceeds to Step #680 in which the complete closing of the shutter is waited, and returns to Step #125 of the first subroutine.

On the other hand, if the flag FLF is set at 1, that is the case that the flash light photography is selected, this subroutine proceeds to Step #650 in which a command signal for starting of the flash light emission is generated, and proceeds to Step #655 in which the timer T is set at another time T2 and started to count down the time T2. Subsequently, this subroutine proceeds to Step #660 in which it is discriminated whether a command signal for stopping the emission is generated from the dimmer circuit 64. If the stop command-signal is generated, this subroutine proceeds to Step #675. If the stop command signal is not generated, this subroutine proceeds to Step #665 in which the counting down of the timer T reaches the time T2. When the counting down of the timer T reaches the time T2, this subroutine proceeds to Step #670 in which the flash light emission is stopped, and proceeds to Step #675. The time T2 is time during which the flash light is emitted.

In the above embodiment, the illumination angle of flash light is changed over the entire zooming range. However, the flash light illumination angle may be changed according to the zooming of the taking lens 1 by means of a known mechanism. In this case, when the pseudo zooming is performed, the flash light illumination angle is not changed. Accordingly, even exposure is given to the film. Also, the flash light is incident on the film from the outside of the range specified by the pseudo zooming. For this reason, it is preferable that flash dimming is performed by a known TTL direct light measurement. In the case that flash dimming is performed by the TTL direct light measurement, the receiving means receives the light transmitted through the aperture. Accordingly, unlike the case that the receiving means is provided in the viewfinder, it is not required to correct the reference voltage Vr based on the control shutter speed Tvc.

Further, in the above embodiment, irrespective of the flash light photography and the natural light photography, the control shutter speed Tvc is set at such a value that the film can be exposed properly only by the natural light. However, the following setting may be permittable. Even in the flash light photography (FLF=1), the exposure difference ΔEvf is calculated. When ΔEvf is greater than ΔEv, the control shutter speed Tvc is set at the shutter speed Tvf. When ΔEvf is equal to or smaller than ΔEv, the control shutter speed Tvc is set at a predetermined value which is greater than the shutter speed Tvf, for example, Tvc=Tvf+1. In this case, the film cannot be fully exposed by only the natural light at the time of the flash photography. Consequently, the film can be properly exposed by the flash light.

Furthermore, in the above embodiment, the flash unit is provided in the camera. However, it may be appropriate to use a flash unit mountable on an outside of the camera.

As described above, an camera of the present invention is capable of executing the real zooming and the pseudo zooming. If the brightness of the object is greater than a predetermined value, the priority is given to the real zooming. If the set photographic magnification is beyond the maximum magnification of the real zooming, the pseudo zooming is performed to compensate for the deficient magnification. Accordingly, if the object is relatively bright, the photography is executable in which the priority is given to the real zooming to assure the desired quality of picture.

Also, if the brightness of the object is smaller than the predetermined value, the photography is executable in which the priority is given to the pseudo zooming. If the set photographic magnification is beyond the maximum magnification of the pseudo zooming, the real zooming is performed to compensate for the deficient magnification. Accordingly, when photographing a dark object, it is possible to perform exposure at higher shutter speed by decreasing the aperture value F of the taking lens. Consequently, the influence of camera shake can be considerably decreased.

Also, in the flash light photography, the priority is given to the pseudo zooming and the flash unit is usable over the entire zooming range of the real zooming and the pseudo zooming. Therefore, longer flash light coverage range is obtainable, which thus makes it possible to photograph objects having longer object distances. Consequently, even in the flash light photography, zooming photography can be performed with ease.

Furthermore, it would be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A camera comprising:
   a photo-taking lens, capable of changing its focal length, for photographing an object, a fully opened aperture value of said photo-taking lens being changed in accordance with a change in said focal length;
   means for measuring a brightness of said object through an auxiliary lens other than said photo-taking lens;
   means for producing a desired focal length;
   means for generating a magnification signal representative of a magnification corresponding to a size of reproduction in comparison with that of a photographed image;
   means for determining both of the focal length of said photo-taking lens and said magnification according to said desired focal length and said measured brightness; and
   means for controlling an exposure value of said camera with taking a fully opened aperture value corresponding to said determined focal length into consideration.

2. A camera as claimed in claim 1, further comprising, means for comparing said measured brightness with a predetermined reference value, and wherein said determining means determines both of the focal length of said photo-taking lens and the magnification according to the result of said comparing means.

3. A camera as claimed in claim 2, further comprising, means for setting said predetermined reference value according to said desired focal length.

4. A camera comprising:
   a photo-taking lens, capable of changing its focal lenfth, for photographing an object;
   means for measuring a brightness of said object;
   means for calculating a shutter speed according to said measured brightness;
   means for producing a desired focal length;
   means for determining a reference shutter speed according to said desired focal length;
   means for comparing said calculated shutter speed with said reference shutter speed determined;
   means for generating a magnification signal representative of a magnification corresponding to a size of reproduction in comparison with that of a photographed image; and
   means for determining both of the focal length of said photo-taking lens and the magnification according to said desired focal length and the compared result.

5. A camera comprising:
   a photo-taking lens, capable of changing its focal length, for photographing an object;
   means for producing a desired focal length;
   means for illuminating the object to be photographed;
   means for selecting whether or not said illuminating means is used during photographing;
   means for detecting whether or not said illuminating means is used;
   means for generating a magnification signal representative of a magnification corresponding to a size of reproduction in comparison with that of a photographed image; and
   means for determining both of the focal length of said photo-taking lens and the magnification according to said desired focal length and the detected result.

6. A camera as claimed in claim 5, wherein said determining means includes means for determining the magnification to be greater when the detected result represents that said illuminating means is used than when the detected result represents that said illuminating means is not used.

7. A camera comprising:
- a photo-taking lens, capable of changing its focal length, for photographing an object;
- means for producing a desired focal length;
- means for generating a magnification signal representative of a magnification corresponding to a size of reproduction in comparison with that of a photographed image;
- a viewfinder, capable of changing its finder magnification, for showing said object to be photographed, said viewfinder being provided independently of said photo-taking lens;
- means for setting said finder magnification according to the desired focal length;
- means for determining both of the focal length of said photo-taking lens and the magnification according to said desired focal length;
- means for driving said photo-taking lens so as to set the focal length thereof to said determined focal length; and
- means for controlling said setting means and said driving means so that said setting means is operated before a photographing operation of said camera is started, and so that said driving means is operated in response to a start of photographing operation of said camera.

8. A camera as claimed in claim 7, wherein said controlling means includes means, having an operable button, for starting the operation of said setting means in response to the depression of said operable button to a first stage, and for starting the operation of said driving means in response to the depression of said operable button to a second stage deeper than said first stage.

9. A camera comprising:
- a photo-taking lens, capable of changing its focal length, for photographing an object;
- means for measuring a distance to said object;
- means for producing a desired focal length on the basis of said measured distance;
- means for generating a magnification signal representative of a magnification corresponding to a size of reproduction in comparison with that of a photographed image; and
- means for determining both the focal length of said photo-taking lens and the magnification according to said desired focal length.

10. a camera comprising:
- a photo-taking lens, capable of changing its focal length, for photographing an object;
- means for producing a desired focal length;
- means for generating a magnification signal representative of a magnifiction corresponding to a size of reproduction in comparison with that of a photographed image;
- means for determining both of the focal length of said photo-taking lens and the magnification in accordance with said desired focal length;
- means for indicating whether or not said focal length is determined to be its shortest focal length; and
- means for indicating whether or not said magnification is determined to be its minimum magnification.

11. A camera as claimed in claim 10, further comprising means for displaying said desired focal length.

* * * * *